(12) United States Patent
Gu et al.

(10) Patent No.: US 12,039,901 B2
(45) Date of Patent: Jul. 16, 2024

(54) WIRELESS PROJECTION METHOD, APPARATUS, AND SYSTEM

(71) Applicant: HUAWEI TECHNOLOGIES CO., LTD., Guangdong (CN)

(72) Inventors: Yanjie Gu, Shenzhen (CN); Weihua Li, Shanghai (CN); Yunfeng Han, Suzhou (CN); Lin Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/300,435

(22) Filed: Apr. 14, 2023

(65) Prior Publication Data

US 2023/0252919 A1 Aug. 10, 2023

Related U.S. Application Data

(63) Continuation of application No. PCT/CN2020/121686, filed on Oct. 16, 2020.

(51) Int. Cl.
*H04W 52/02* (2009.01)
*G09G 3/00* (2006.01)

(52) U.S. Cl.
CPC ....... *G09G 3/002* (2013.01); *G09G 2330/022* (2013.01); *G09G 2354/00* (2013.01); *G09G 2370/16* (2013.01)

(58) Field of Classification Search
None
See application file for complete search history.

(56) References Cited

U.S. PATENT DOCUMENTS

2018/0270733 A1 9/2018 Tohzaka et al.
2021/0345243 A1* 11/2021 Yun .................. H04W 52/0235

OTHER PUBLICATIONS

Extended European Search Report issued in EP20957281.7, dated Oct. 6, 2023, 7 pages.

* cited by examiner

*Primary Examiner* — Carl Adams

(57) ABSTRACT

Embodiments of the present disclosure relate to the field of communication technologies and disclose a wireless projection method, apparatus, and system. The method includes: A wireless projection apparatus determines, based on a display frame rate used when the wireless projection apparatus displays an image, a duration of a first transmission period. The wireless projection apparatus negotiates with a display apparatus to determine a configuration of a time domain resource in the first transmission period, where the time domain resource in the first transmission period is configured to include a first time segment, a second time segment, and a third time segment, the first time segment is used to send first data to the display apparatus, the second time segment is used to receive second data sent by the display apparatus, and the third time segment is used for sleep.

18 Claims, 11 Drawing Sheets

WIRELESS PROJECTION METHOD, APPARATUS, AND SYSTEM

CROSS-REFERENCE TO RELATED APPLICATIONS

This application is a continuation of International Application No. PCT/CN2020/121686, filed on Oct. 16, 2020, the disclosure of which is hereby incorporated by reference in its entirety.

TECHNICAL FIELD

Embodiments of the present disclosure relate to the field of communication technologies, and in particular, to a wireless projection method, apparatus, and system.

BACKGROUND

With development of communication technologies, an electronic device such as a mobile phone and a computer can project, for displaying, based on a wireless projection technology and a wireless fidelity (Wi-Fi) network, content displayed on a local display to another electronic device with a large display such as a television, to obtain better display effect and improve user experience of watching a movie or playing a game.

Currently, during wireless projection, the electronic device needs to sleep in a Wi-Fi sleep period. However, the electronic device has a high display frame rate, and transmits a frame of image within a short duration, and a Wi-Fi transmission period or the Wi-Fi sleep period is long. In this case, if the electronic device is in sleep, an image cannot be transmitted based on the display frame rate, which affects Wi-Fi projection effect. Therefore, even when no data is transmitted, the electronic device still needs to stay in a listening state, and cannot sleep. This increases power consumption of a Wi-Fi chip, and affects a service life of the Wi-Fi chip.

SUMMARY

Embodiments of the present disclosure provide a wireless projection method, apparatus, and system, to determine a transmission period based on a display frame rate, configure a time segment for sleep in the transmission period, and perform transmission of data based on the transmission period, thereby effectively reducing power consumption of a Wi-Fi chip.

According to a first aspect, an embodiment of the present disclosure provides a wireless projection method. The method may be performed by a wireless projection apparatus, or may be performed by a component (for example, a chip system) in the wireless projection apparatus. The method includes: The wireless projection apparatus determines, based on a display frame rate used when the wireless projection apparatus displays an image, a duration of a first transmission period. The wireless projection apparatus negotiates with the display apparatus to determine a configuration of a time domain resource in the first transmission period. The time domain resource in the first transmission period is configured to include a first time segment, a second time segment, and a third time segment. The first time segment is used to send first data to the display apparatus. The second time segment is used to receive second data sent by the display apparatus. The third time segment is used for sleep. The wireless projection apparatus performs, with the display apparatus in the first transmission period, transmission of wireless projection data.

The first data includes a first image, and the first image includes, for example, a video image, an animation image, or a text file image. The first data may further include a control command sent by the wireless projection apparatus to the display apparatus, and the like. For example, the second data includes data that needs to be fed back to the wireless projection apparatus after the display apparatus detects a touch or a key operation, image data collected by the display apparatus, and the like. Wireless projection is implemented through interaction and transmission of the first data and the second data.

In some embodiments, if the display apparatus does not generate the second data, the display apparatus does not need to configure the second time segment, or the second time segment is configured as zero. After obtaining first information, the display apparatus determines, based on the first transmission period and the first time segment, all remaining time segments in the first transmission period as the third time segment.

In this way, in a process in which the wireless projection apparatus performs wireless projection via the display apparatus, transmission of the wireless projection data can be performed in the first transmission period, thereby avoiding a data loss. The configuration of the time domain resource in the first transmission period determined by the wireless projection apparatus is the same as that determined by the display apparatus. This can ensure that both the wireless projection apparatus and the display apparatus are in a sleep state in the third time segment without a delay caused by sleep, and can improve user experience while reducing power consumption.

In a possible implementation, that the wireless projection apparatus negotiates with the display apparatus to determine the configuration of the time domain resource in the first transmission period includes: The wireless projection apparatus sends the first information to the display apparatus. The first information indicates the duration of the first transmission period and a duration of the first time segment. The wireless projection apparatus receives second information sent by the display apparatus in response to the first information. The second information indicates a duration of the second time segment. The wireless projection apparatus configures, based on the duration of the first time segment and the duration of the second time segment, a remaining time segment in the first transmission period as the third time segment.

Optionally, the first information may indicate the duration of the first transmission period and the duration of the first time segment in an implicit notification manner or an explicit notification manner. The implicit notification manner includes information about that the first information carries the duration of the first transmission period and the duration of the first time segment. The explicit notification manner includes a pre-configuration information reading manner, and the first information directly indicates the configuration of the time domain resource. For example, the first information is indication information. After receiving the first information, the display apparatus can determine, in a manner agreed with the wireless projection apparatus in advance, the duration of the first transmission period and the duration of the first time segment that are indicated in the first information.

For example, it is assumed that the duration of the first transmission period is 10 ms, and the duration of the first time segment is 6 ms. In this case, the first information may be 111111XXXX. Each bit indicates 1 ms, a quantity of bits occupied by the first information indicates the duration of the first transmission period, and a value 1 of a bit indicates that the bit is used to transmit the first data.

In this way, after receiving the first information, the display apparatus can configure a time domain resource of a remaining time segment in the first transmission period based on the duration of the first time segment.

Optionally, the second information may indicate a duration of the second time segment in an implicit notification manner or an explicit notification manner. The implicit notification manner includes that the second information carries information about the duration of the second time segment. The explicit notification manner includes a pre-configuration information reading manner, and the second information directly indicates the configuration of the time domain resource. For example, the second information is indication information. After receiving the second information, the wireless projection apparatus can determine, in a manner agreed with the display apparatus in advance, the duration of the second time segment indicated in the second information.

For example, it is assumed that the duration of the first transmission period is 10 ms, the duration of the first time segment is 6 ms, and the duration of the second time segment is 1 ms. In this case, the second information may be 1111110XXX. A value 0 of a bit indicates that the bit is used to transmit the second data.

In this way, after receiving the second information, the wireless projection apparatus can configure, based on the duration of the second time segment, a remaining time segment as the third time segment for sleep. In addition, interaction between the first information and the second information can ensure that the wireless projection apparatus and the display apparatus determine a same transmission period and a same sleep time segment.

In a possible implementation, in the first transmission period, the first time segment, the second time segment, and the third time segment are sequentially configured.

In some embodiments, to implement wireless projection, it should be first ensured that the wireless projection apparatus sends image data to the display apparatus. Therefore, the first time segment should be first configured in the first transmission period. In other words, in a process of configuring the first transmission period resource, a preceding time domain resource is configured as a resource used to transmit the first data. Then, the second time segment and third time segment are sequentially configured.

It may be understood that the duration of the first time segment and the duration of the second time segment should be less than that of the first transmission period.

In a possible implementation, before the wireless projection apparatus performs transmission of data with the display apparatus in the first transmission period, the method further includes: The wireless projection apparatus sends third information to the display apparatus. The third information indicates the display apparatus to calibrate time of the display apparatus based on first time. The first time is determined by the wireless projection apparatus based on a local time and a duration for sending the third information.

In some embodiments, after the first transmission period is configured, if the wireless projection apparatus and the display apparatus need to perform transmission of data in real time in the first transmission period, time synchronization between the wireless projection apparatus and the display apparatus needs to be ensured. Therefore, before projection, time of the wireless projection apparatus and the time of the display apparatus need to be calibrated.

In this way, time calibration ensures that local time of the wireless projection apparatus is the same as that of the display apparatus. The wireless projection apparatus and the display apparatus can implement real-time Wi-Fi wireless projection based on the same time and the configured first transmission period to avoid a projection exception.

In some embodiments, in a Wi-Fi network, a STA sends a beacon frame in a fixed period to perform time synchronization. Therefore, a TSF timer is configured in a Wi-Fi chip for TSF calibration. The TSF timer can determine the local time of the wireless projection apparatus. Then, if the local time needs to be sent, in a data sending process, component transmission is also time-consuming. Therefore, the TSF timer needs to determine the first time based on current local time of the wireless projection apparatus and time consumed for sending the local time in the future, to ensure that the display apparatus obtains an accurate time reference.

In a possible implementation, the method further includes: The wireless projection apparatus sends the third information to the display apparatus in a second transmission period. The second transmission period is a beacon period.

In some embodiments, to avoid unaligned time between the wireless projection apparatus and the display apparatus due to a local time change of the wireless projection apparatus and/or the display apparatus during projection, the second transmission period is configured. During wireless projection, the wireless projection apparatus and the display apparatus perform time calibration based on the second transmission period. To implement Wi-Fi wireless projection, the wireless projection apparatus and the display apparatus are connected to a same Wi-Fi network. In a TSF mechanism, the wireless projection apparatus and the display apparatus can periodically send a beacon frame to implement time synchronization. Therefore, the second transmission period is configured as a beacon sending period.

In a possible implementation, the method further includes: The wireless projection apparatus performs one or more of the following contents in the first transmission period: sending the first data to the display apparatus in the first time segment, receiving, in the second time segment, the second data sent by the display apparatus, or sleeping in the third time segment.

In this way, transmission of data is performed based on the time domain resource of the configured first transmission period, so that a data loss can be avoided, and wireless projection can be implemented. In addition, sleep can be performed in a same time period, thereby reducing power consumption of the Wi-Fi chip.

In a possible implementation, the method further includes: The wireless projection apparatus receives a first request sent by the display apparatus. The first request is used to request to sleep, and the first request is a request sent by the display apparatus at any one of the following moments: at an end of the second time segment, after last second data is sent, at an end of the first time segment, and after last first data is received. In response to the first request, the wireless projection apparatus indicates the display apparatus to sleep. Then the wireless projection apparatus starts to sleep.

In some embodiments, the wireless projection apparatus adds a flag to the last sent first data. After receiving the first data, the display apparatus can determine, based on the flag, that current data is the last first data.

In a possible implementation, the method further includes: The wireless projection apparatus receives a second request sent by the display apparatus. The second request is used to request to wake up. The second request is a request sent by the display apparatus after the first transmission period ends. In response to the second request, the wireless projection apparatus wakes up the display apparatus and sends the first data to the display apparatus.

In this way, before and after the sleep time segment, the display apparatus sends a request to the wireless projection apparatus to request to sleep or wake up, so as to ensure that the wireless projection apparatus and the display apparatus can sleep or wake up at the same time, thereby avoiding a loss of transmitted data. Specifically, the wireless projection apparatus and the display apparatus perform time calibration based on the second transmission period, to ensure that between two time calibration points, there is no transmission exception caused by unaligned time between the wireless projection apparatus and the display apparatus.

In a possible implementation, the duration of the first transmission period meets transmission of the wireless projection data performed by the wireless projection apparatus based on the display frame rate.

In a possible implementation, the first transmission period is a reciprocal of the display frame rate.

In this way, the wireless projection apparatus determines a first transmission period based on a display frame rate when a first image is displayed. This ensures that the currently displayed first image can be normally wirelessly projected.

According to a second aspect, an embodiment of the present disclosure provides a wireless projection method. The method may be performed by a display apparatus, or may be performed by a component (for example, a chip system) in the display apparatus. The method includes: The display apparatus negotiates with a wireless projection apparatus to determine a configuration of a time domain resource in a first transmission period. A duration of the first transmission period is determined by the wireless projection apparatus based on a display frame rate when an image is displayed. The time domain resource in the first transmission period is configured to include a first time segment, a second time segment, and a third time segment. The first time segment is used to receive first data sent by the wireless projection apparatus. The second time segment is a time segment that is determined by the display apparatus and that is used to send second data to the wireless projection apparatus. The third time segment is used for sleep. The display apparatus performs, with the wireless projection apparatus in the first transmission period, transmission of wireless projection data, and displays the image.

In a possible implementation, that the display apparatus negotiates with a wireless projection apparatus to determine a configuration of a time domain resource in a first transmission period includes: The display apparatus receives first information sent by the wireless projection apparatus. The first information indicates the duration of the first transmission period and a duration of the first time segment. In response to the first information, the display apparatus sends second information to the wireless projection apparatus. The second information indicates a duration of the second time segment. The display apparatus configures, based on the a duration of the first time segment and the duration of the second time segment, a remaining time segment in the first transmission period as the third time segment.

In a possible implementation, in the first transmission period, the first time segment, the second time segment, and the third time segment are sequentially configured.

In a possible implementation, before the display apparatus performs, with the wireless projection apparatus in the first transmission period, transmission of data, the method further includes: The display apparatus receives third information sent by the wireless projection apparatus, and obtains first time. The display apparatus determines second time based on the first time and a duration for receiving the third information. The display apparatus calibrates local time based on the second time.

In a possible implementation, the method further includes: The display apparatus receives, in a second transmission period, the third information sent by the wireless projection apparatus. The second transmission period is a beacon period.

In a possible implementation, the method further includes: The display apparatus performs one or more of the following contents in the first transmission period: receiving the first data sent by the wireless projection apparatus in the first time segment, sending the second data to the wireless projection apparatus in the second time segment, or sleeping in the third time segment.

In a possible implementation, the method further includes: The display apparatus sends a first request to the wireless projection apparatus. The first request is used to request to sleep. The first request is sent at any one of the following moments: at an end of the second time segment, after last second data is sent, at an end of the first time segment, and after last first data is received. After determining that the wireless projection apparatus receives the first request, the display apparatus starts to sleep.

In a possible implementation, the method further includes: The display apparatus sends a second request to the wireless projection apparatus after the first transmission period ends. The second request is used to request to wake up. After determining that the wireless projection apparatus receives the second request, the display apparatus wakes up and starts to receive the first data.

In a possible implementation, the duration of the first transmission period meets display of the image by the display apparatus based on the display frame rate.

In a possible implementation, the first transmission period is a reciprocal of the display frame rate.

In addition, for technical effect of the wireless projection method according to the second aspect, refer to the technical effect of the wireless projection method according to the first aspect. Details are not described herein again.

According to a third aspect, an embodiment of the present disclosure provides a wireless projection apparatus. The apparatus may include a processing module and a transceiver module. The processing module is configured to determine, based on a display frame rate used when the wireless projection apparatus displays an image, a duration of a first transmission period. The processing module is further configured to negotiate with a display apparatus to determine a configuration of a time domain resource in the first transmission period. The time domain resource in the first transmission period is configured to include a first time segment, a second time segment, and a third time segment. The first time segment is used to send first data to the display apparatus. The second time segment is used to receive second data sent by the display apparatus. The third time segment is used for sleep. The transceiver module is configured to perform, with the display apparatus in the first transmission period, transmission of wireless projection data.

In a possible implementation, the transceiver module is specifically configured to: send first information to the display apparatus, where the first information indicates the duration of the first transmission period and a duration of the first time segment; and receive second information sent by the display apparatus in response to the first information, where the second information indicates a duration of the second time segment. The processing module is specifically configured to: configure, based on the duration of the first time segment and the duration of the second time segment, a remaining time segment in the first transmission period as the third time segment.

In a possible implementation, in the first transmission period, the first time segment, the second time segment, and the third time segment are sequentially configured.

In a possible implementation, the transceiver module is further configured to send third information to the display apparatus. The third information indicates the display apparatus to calibrate time of the display apparatus based on first time.

In a possible implementation, the first time is determined by the processing module based on a local time and a duration for sending the third information.

In a possible implementation, the transceiver module is further configured to send the third information to the display apparatus in a second transmission period. The second transmission period is a beacon period.

In a possible implementation, the transceiver module is further configured to perform one or more of the following contents in the first transmission period: sending the first data to the display apparatus in the first time segment, receiving, in the second time segment, the second data sent by the display apparatus, or sleeping in the third time segment.

In a possible implementation, the transceiver module is further configured to receive a first request sent by the display apparatus. The first request is used to request to sleep. The first request is a request sent by the display apparatus at any one of the following moments: at an end of the second time segment, after last second data is sent, at an end of the first time segment, and after last first data is received. The processing module is further configured to: after indicating, in response to the first request, the display apparatus to sleep, control the transceiver module to sleep.

In a possible implementation, the transceiver module is further configured to receive a second request sent by the display apparatus. The second request is used to request to wake up. The second request is a request sent by the display apparatus after the first transmission period ends. The processing module is further configured to: in response to the second request, wake up the display apparatus, and control the transceiver module to send the first data to the display apparatus.

In a possible implementation, the duration of the first transmission period meets transmission of the wireless projection data based on the display frame rate.

In a possible implementation, the first transmission period is a reciprocal of the display frame rate.

Optionally, the transceiver module may include a sending module and a receiving module. The sending module is configured to send wireless projection data to the display apparatus. The receiving module is configured to receive wireless projection data sent by the display apparatus. A specific implementation of the transceiver module is not specifically limited in embodiments of the present disclosure.

Optionally, the wireless projection apparatus according to the third aspect may further include a storage module. The storage module stores a program or instructions. When the processing module executes the program or the instructions, the wireless projection apparatus according to the third aspect is enabled to perform the wireless projection method according to the first aspect.

It should be noted that the wireless projection apparatus according to the third aspect may be a wireless projection apparatus, a chip (system) that can be disposed in the wireless projection apparatus, or another part or component. This is not limited in the present disclosure.

In addition, for technical effect of the wireless projection apparatus according to the third aspect, refer to the technical effect of the wireless projection method according to the first aspect. Details are not described herein again.

According to a fourth aspect, an embodiment of the present disclosure provides a display apparatus. The apparatus may include a transceiver module, a processing module, and a display module. The processing module is configured to negotiate with a wireless projection apparatus to determine a configuration of a time domain resource in a first transmission period. A duration of the first transmission period is determined by the wireless projection apparatus based on a display frame rate when an image is displayed. The time domain resource in the first transmission period is configured to include a first time segment, a second time segment, and a third time segment. The first time segment is used to receive first data sent by the wireless projection apparatus. The second time segment is a time segment that is determined by the processing module and that is used to send second data to the wireless projection apparatus. The third time segment is used for sleep. The transceiver module is configured to perform, with the wireless projection apparatus in the first transmission period, transmission of wireless projection data. A display module is configured to display the image based on the wireless projection data.

In a possible implementation, the transceiver module is specifically configured to receive first information sent by the wireless projection apparatus. The first information indicates the duration of the first transmission period and a duration of the first time segment. The transceiver module is further configured to send second information to the wireless projection apparatus. The second information indicates a duration of the second time segment. The processing module is specifically configured to: configure, based on the duration of the first time segment and the duration of the second time segment, a remaining time segment in the first transmission period as the third time segment.

In a possible implementation, in the first transmission period, the first time segment, the second time segment, and the third time segment are sequentially configured.

In a possible implementation, the transceiver module is further configured to receive third information sent by the wireless projection apparatus, to obtain first time. The transceiver module is specifically configured to determine second time based on the first time and a duration for receiving the third information, and calibrate local time based on the second time.

In a possible implementation, the transceiver module is further configured to receive, in a second transmission period, the third information sent by the wireless projection apparatus. The second transmission period is a beacon period.

In a possible implementation, the transceiver module is further configured to perform one or more of the following contents in the first transmission period: receiving the first data sent by the wireless projection apparatus in the first time segment, sending the second data to the wireless projection apparatus in the second time segment, or sleeping in the third time segment.

In a possible implementation, the transceiver module is further configured to send a first request to the wireless projection apparatus. The first request is used to request to sleep. The first request is sent at any one of the following moments: at an end of the second time segment, after last second data is sent, at an end of the first time segment, and after last first data is received. The transceiver module is further configured to: after determining that the wireless projection apparatus receives the first request, start to sleep.

In a possible implementation, the transceiver module is further configured to send a second request to the wireless projection apparatus after the first transmission period ends. The second request is used to request to wake up. The transceiver module is further configured to: after determining that the wireless projection apparatus receives the second request, wake up and start to receive the first data.

In a possible implementation, the duration of the first transmission period meets display of the image by the display module based on the display frame rate.

In a possible implementation, the first transmission period is a reciprocal of the display frame rate.

Optionally, the transceiver module may include a receiving module and a sending module. The receiving module is configured to receive wireless projection data sent by the wireless projection apparatus. The sending module is configured to send wireless projection data to the wireless projection apparatus. A specific implementation of the transceiver module is not specifically limited in embodiments of the present disclosure.

Optionally, the display apparatus according to the fourth aspect may further include a storage module. The storage module stores a program or instructions. When the processing module executes the program or the instructions, the display apparatus according to the fourth aspect is enabled to perform the wireless projection method according to the second aspect.

It should be noted that the display apparatus according to the fourth aspect may be a display apparatus, a chip (system) that can be disposed in the display apparatus, or another part or component. This is not limited in the present disclosure.

In addition, for technical effect of the display apparatus according to the fourth aspect, refer to the technical effect of the wireless projection method according to the first aspect. Details are not described herein again.

According to a fifth aspect, an embodiment of the present disclosure provides a wireless projection apparatus. The apparatus may include a processor and a transceiver. The processor is configured to: determine, based on a display frame rate used when the wireless projection apparatus displays an image, a duration of a first transmission period; and negotiate with a display apparatus to determine a configuration of a time domain resource in the first transmission period. The time domain resource in the first transmission period is configured to include a first time segment, a second time segment, and a third time segment. The first time segment is used to send first data to the display apparatus. The second time segment is used to receive second data sent by the display apparatus. The third time segment is used for sleep. The transceiver is configured to perform, with the display apparatus in the first transmission period, transmission of wireless projection data.

In a possible implementation, the transceiver is specifically configured to: send first information to the display apparatus, where the first information indicates the duration of the first transmission period and a duration of the first time segment; and receive second information sent by the display apparatus in response to the first information, where the second information indicates a duration of the second time segment. The processor is specifically configured to: configure, based on the duration of the first time segment and the duration of the second time segment, a remaining time segment in the first transmission period as the third time segment.

In a possible implementation, in the first transmission period, the first time segment, the second time segment, and the third time segment are sequentially configured.

In a possible implementation, the transceiver is further configured to send third information to the display apparatus. The third information indicates the display apparatus to calibrate time of the display apparatus based on first time. The first time is determined by the transceiver based on a local time and a duration for sending the third information.

In a possible implementation, the transceiver is further configured to send the third information to the display apparatus in a second transmission period. The second transmission period is a beacon period.

In a possible implementation, the transceiver is further configured to receive a first request sent by the display apparatus. The first request is used to request to sleep, and the first request is a request sent by the display apparatus at any one of the following moments: at an end of the second time segment, after last second data is sent, at an end of the first time segment, and after last first data is received. The processor is further configured to: after indicating, in response to the first request, the display apparatus to sleep, control the transceiver to sleep.

In a possible implementation, the transceiver is further configured to receive a second request sent by the display apparatus. The second request is used to request to wake up. The second request is a request sent by the display apparatus after the first transmission period ends. The processor is further configured to: in response to the second request, wake up the display apparatus, and control the transceiver to send the first data to the display apparatus.

In a possible implementation, the duration of the first transmission period meets transmission of the wireless projection data performed by the transceiver based on the display frame rate.

In a possible implementation, the first transmission period is a reciprocal of the display frame rate.

In addition, for technical effect of the wireless projection apparatus according to the fifth aspect, refer to the technical effect of the wireless projection method according to the first aspect. Details are not described herein again.

According to a sixth aspect, an embodiment of the present disclosure provides a display apparatus. The apparatus may include a processor, a transceiver, and a display. The processor is configured to negotiate with a wireless projection apparatus to determine a configuration of a time domain resource in a first transmission period. A duration of the first transmission period is determined by the wireless projection apparatus based on a display frame rate when an image is displayed. The time domain resource in the first transmission period is configured to comprise a first time segment, a second time segment, and a third time segment. The first time segment is used to receive first data sent by the wireless projection apparatus. The second time segment is a time segment that is determined by the processor and that is used to send second data to the wireless projection apparatus. The third time segment is used for sleep. The transceiver is configured to perform, with the wireless projection apparatus in the first transmission period, transmission of wireless projection data. The display is configured to display the image based on the wireless projection data.

In a possible implementation, the transceiver is specifically configured to: receive first information sent by the wireless projection apparatus, where the first information indicates the duration of the first transmission period and a duration of the first time segment; and send second information to the wireless projection apparatus, where the second information indicates a duration of the second time segment. The processor is specifically configured to: configure, based on the duration of the first time segment and the duration of the second time segment, a remaining time segment in the first transmission period as the third time segment.

In a possible implementation, in the first transmission period, the first time segment, the second time segment, and the third time segment are sequentially configured.

In a possible implementation, the transceiver is further configured to: receive third information sent by the wireless projection apparatus, and obtain first time; determine second time based on the first time and a duration for receiving the third information; and calibrate local time based on the second time.

In a possible implementation, the transceiver is further configured to receive, in a second transmission period, the third information sent by the wireless projection apparatus. The second transmission period is a beacon period.

In a possible implementation, the transceiver is further configured to send a first request to the wireless projection apparatus. The first request is used to request to sleep. The first request is sent at any one of the following moments: at an end of the second time segment, after last second data is sent, at an end of the first time segment, and after last first data is received. The processor is further configured to control, after determining that the wireless projection apparatus receives the first request, the transceiver to sleep.

In a possible implementation, the transceiver is further configured to send a second request to the wireless projection apparatus after the first transmission period ends. The second request is used to request to wake up. The processor is further configured to: after determining that the wireless projection apparatus receives the second request, wake up the transceiver and control the transceiver to receive the first data.

In a possible implementation, the duration of the first transmission period meets display of the image by the display based on the display frame rate.

In a possible implementation, the first transmission period is a reciprocal of the display frame rate.

In addition, for technical effect of the display apparatus according to the sixth aspect, refer to the technical effect of the wireless projection method according to the second aspect. Details are not described herein again.

According to a seventh aspect, an embodiment of the present disclosure provides a wireless projection device, including a processor and a memory. The memory is configured to store a computer program. The processor is configured to execute the computer program stored in the memory, so that the wireless projection device performs the method according to any one of the first aspect, the second aspect, and the possible implementations of the first aspect and the second aspect.

According to an eighth aspect, an embodiment of the present disclosure provides a wireless projection device. The device includes a processor and an interface circuit. The interface circuit is configured to: receive code instructions and transmit the code instructions to the processor. The processor is configured to run the code instructions to perform the method according to any one of the first aspect, the second aspect, and the possible implementations of the first aspect and the second aspect.

According to a ninth aspect, an embodiment of the present disclosure provides a wireless projection device. The device may be a chip system. The chip system includes a processor, and may further include a memory, configured to implement a function of the method according to any one of the first aspect, the second aspect, and the possible implementations of the first aspect and the second aspect. The chip system may include a chip, or may include a chip and another discrete component.

According to a tenth aspect, an embodiment of the present disclosure provides a wireless projection device. The device may be a circuit system. The circuit system includes a processing circuit. The processing circuit is configured to perform the method according to any one of the first aspect, the second aspect, and the possible implementations of the first aspect and the second aspect.

According to an eleventh aspect, an embodiment of the present disclosure provides a computer-readable storage medium. The computer-readable storage medium is configured to store instructions. When the instructions are executed, the method according to any one of the first aspect, the second aspect, and the possible implementations of the first aspect and the second aspect is implemented.

According to a twelfth aspect, an embodiment of the present disclosure provides a computer program product including instructions. When the computer program product runs on a computer, the computer is enabled to perform the method according to any one of the first aspect, the second aspect, and the possible implementations of the first aspect and the second aspect.

According to a thirteenth aspect, an embodiment of the present disclosure provides a chip, and the chip includes a processor and an interface circuit. The interface circuit is configured to: receive code instructions and transmit the code instructions to the processor. The processor is configured to run the code instructions to perform the method according to any one of the first aspect, the second aspect, and the possible implementations of the first aspect and the second aspect.

According to a fourteenth aspect, an embodiment of the present disclosure provides a wireless projection system, including a wireless projection apparatus and a display apparatus. The wireless projection apparatus may be configured to implement the method according to any one of the first aspect and the possible implementations of the first aspect. The display apparatus may be configured to implement the method according to any one of the second aspect and the possible implementations of the second aspect.

DESCRIPTION OF EMBODIMENTS

The following describes in detail a wireless projection method, apparatus, and system provided in embodiments of the present disclosure with reference to accompanying drawings.

For ease of understanding, the following first describes related terms and concepts that may be used in embodiments of the present disclosure.

(1) Display Frame Rate

The display frame rate indicates a frequency (also referred to as a rate), in hertz (Hz), at which consecutive images in frames appear on a display. Specifically, the display frame rate describes a quantity of images displayed by an electronic device per second. For example, if the display frame rate is 40 Hz, it indicates that the electronic device displays 40 images per second.

The display frame rate further indicates picture display smoothness of the electronic device. A higher display frame rate indicates smoother picture display, and more realistic display effect. Usually, a display frame rate of a game or a movie picture is high, and a display frame rate of a conference or office projection picture is low.

(2) Timer Synchronization Function (TSF)

WLAN standards define data exchange modes between wireless access points (APs) and stations (STAs). Each electronic device connected to a wireless network may be referred to as a station. In a low power consumption Wi-Fi system, if no data is transmitted between an AP and a STA, the STA enters a low power consumption mode. In a protocol, a TSF mechanism is used to ensure time synchronization between the AP and the STA. Specifically, the AP needs to periodically send a beacon frame, and the STA needs to periodically wake up to receive the beacon frame. For example, the STA initializes a TSF timer, uses a beacon frame to notify another AP device of local time of the STA, and configures a timestamp for sending the beacon frame, to implement time synchronization.

For example, in a Wi-Fi network, a transmission or sleep period of the STA is usually 100 ms. In a low power consumption state, the STA sends a beacon frame every 100 ms to perform time synchronization. Based on this, a display frame rate of an electronic device usually cannot be aligned with a Wi-Fi sleep period. For example, if the display frame rate of the electronic device is 30 Hz, a time period for transmitting an image is about 33.33 ms, and no multiple of the time period can be aligned with 100 ms. If the electronic device sleeps in the Wi-Fi sleep period, no image can be transmitted based on the display frame rate.

Figure 1A:
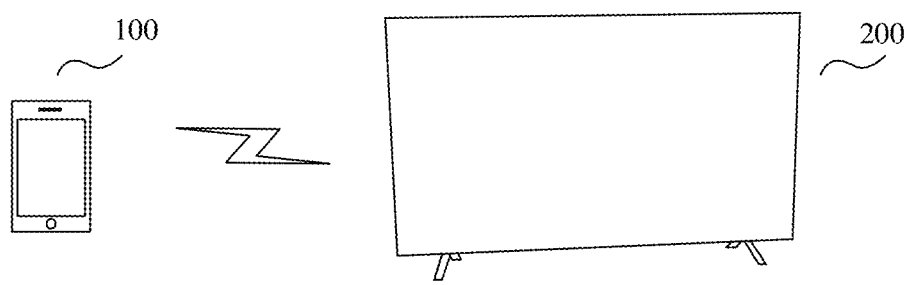
FIG. 1A is a schematic diagram of a structure of a communication system according to an embodiment of the present disclosure.

FIG. 1A is a schematic diagram of a communication system to which a wireless projection method is applied according to an embodiment of the present disclosure. As shown in FIG. 1A, the communication system includes a wireless projection apparatus 100 and a display apparatus 200. The wireless projection apparatus 100 and the display apparatus 200 can be connected over a wireless network, for example, connected over a Wi-Fi network.

In some embodiments, the wireless projection apparatus 100 sends content displayed on a screen to the display apparatus 200 over the Wi-Fi network, and the display apparatus 200 displays the content. In other words, during wireless projection, the content displayed on the wireless projection apparatus 100 is the same as that displayed on the display apparatus 200.

Optionally, the wireless projection apparatus 100 includes, for example, a terminal device that has an image display function, such as a mobile phone, a tablet computer, a notebook computer, an ultra-mobile personal computer (UMPC), a netbook, a personal digital assistant (PDA), a vehicle-mounted device, a user terminal (UT), a user device (UD), user equipment (UE), or an artificial intelligence (AI) device. A specific type of the wireless projection apparatus 100 is not limited in embodiments of the present disclosure.

Optionally, the display apparatus 200 includes, for example, a terminal device that can implement a large-screen display function, such as a notebook computer, a large-screen display apparatus (such as a smart screen), a projection device, an AI device, or a tablet computer. A specific type of the display apparatus 200 is not limited in embodiments of the present disclosure.

Figure 1B:
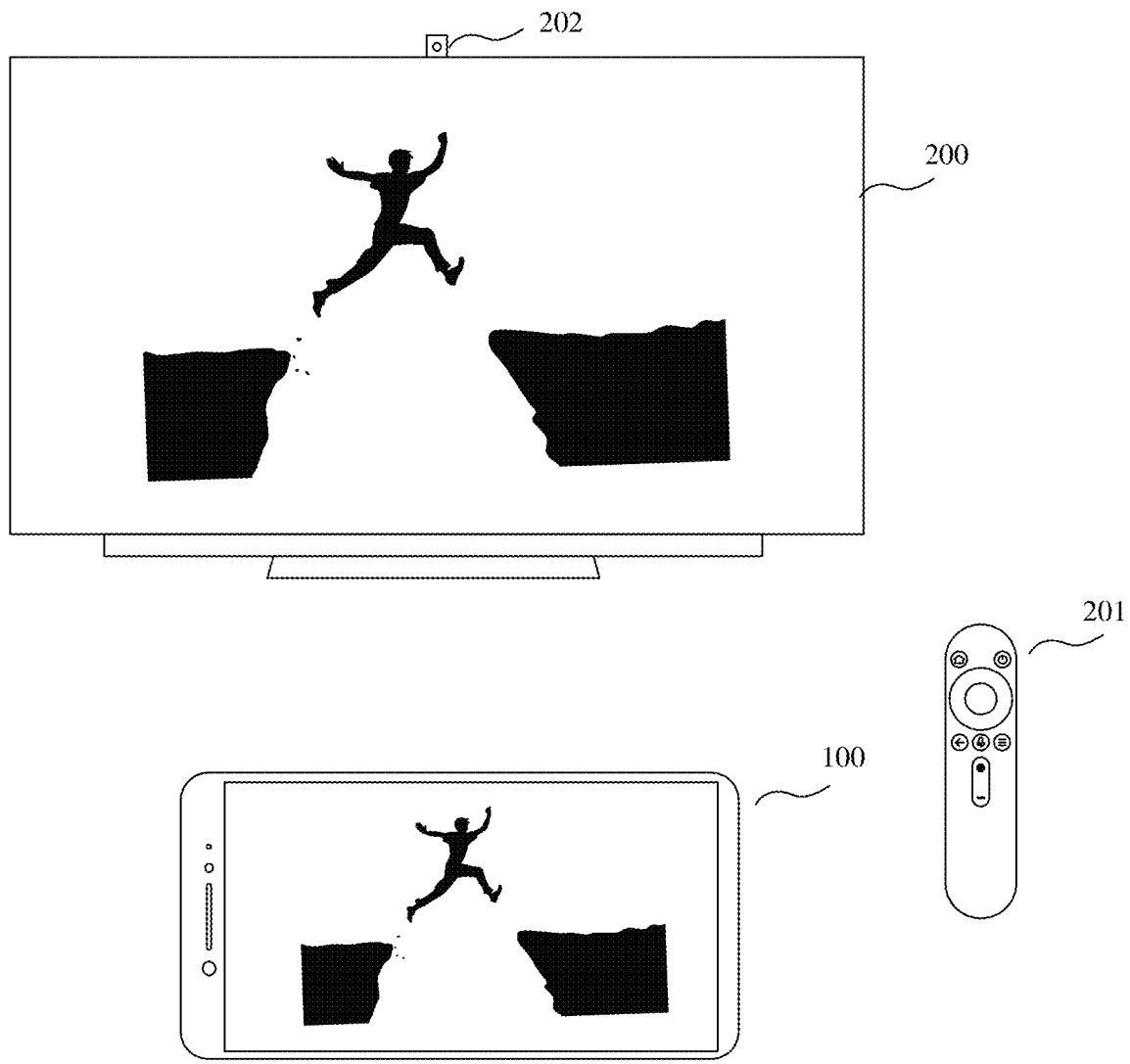
FIG. 1B is a schematic diagram 1 of an application scenario of a wireless projection method according to an embodiment of the present disclosure.

In some wireless projection scenarios, as shown in FIG. 1B, the wireless projection apparatus 100 performs projection with a high display frame rate, such as for a game or a movie. For example, a current display frame rate is greater than 60 Hz. For example, in the scenario shown in FIG. 1B, the wireless projection apparatus 100 is a mobile phone, and the display apparatus 200 is a television. During wireless projection, the wireless projection apparatus 100 uses the content being displayed as first data and transmits the data to the display apparatus 200 over the Wi-Fi network. In addition, the first data further includes a control command sent by the wireless projection apparatus 100 to the display apparatus after the wireless projection apparatus 100 detects that a user taps the screen, a key, or a game controller/remote control 101, for example, a command for operating a character jump shown in FIG. 1B. Optionally, during wireless projection, the display apparatus 200 further sends second data to the wireless projection apparatus 100. For example, the second data may include image data collected by the display apparatus 200 via a camera, and the like. Alternatively, the second data may further include a command, such as pause, detected by the display apparatus 200 through a touchscreen.

Figure 1C:
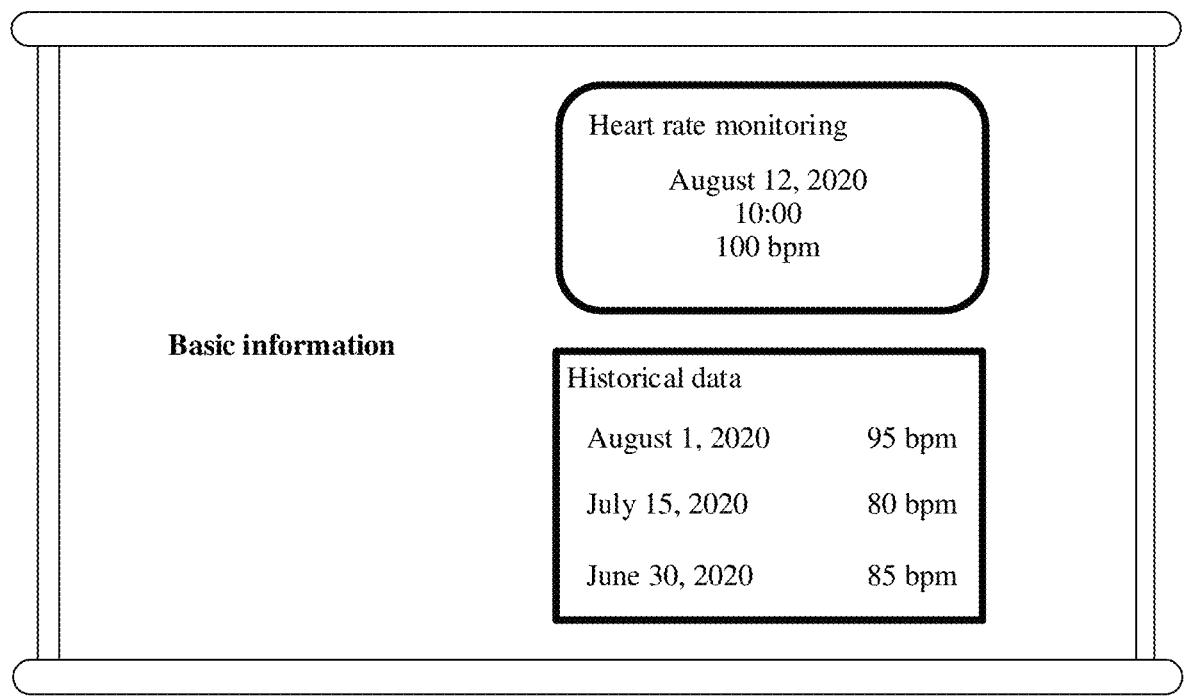
FIG. 1C is a schematic diagram 2 of an application scenario of a wireless projection method according to an embodiment of the present disclosure.
Figure 1C:
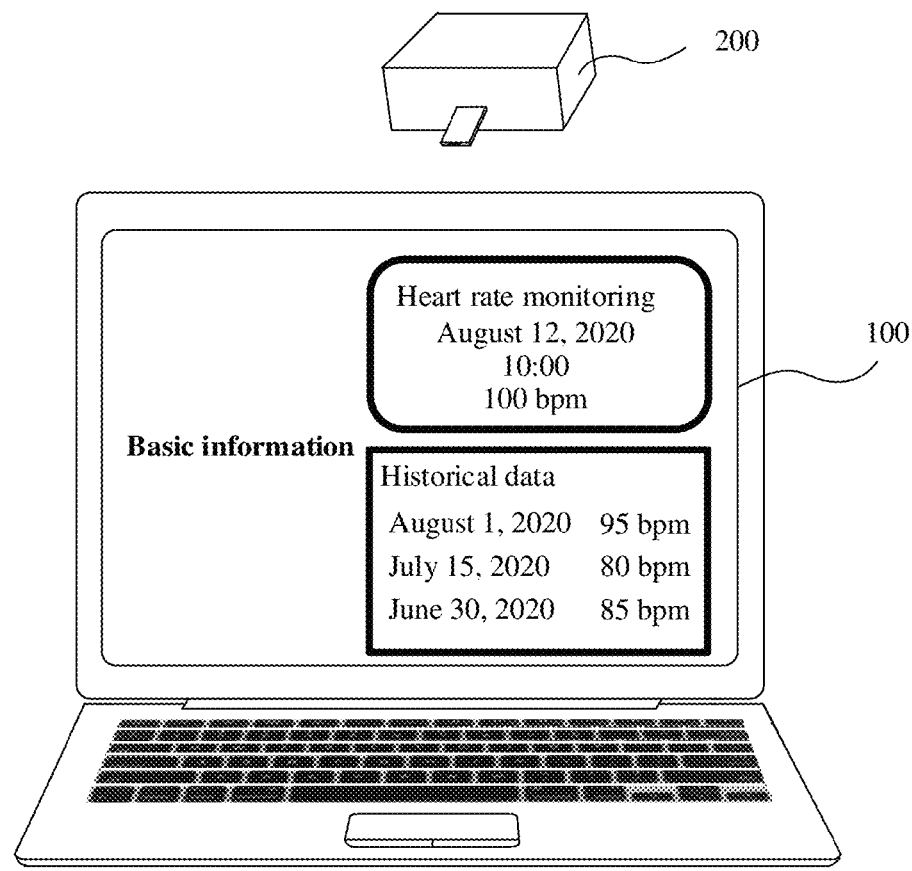

In some other wireless projection scenarios, as shown in FIG. 1C, the wireless projection apparatus 100 performs projection with a low display frame rate in a conference, an office, or the like. For example, a current display frame rate is lower than 20 Hz. For example, in the scenario shown in FIG. 1C, the wireless projection apparatus 100 is a notebook computer, and the display apparatus 200 is a projection device. Similarly, during wireless projection, the wireless projection apparatus 100 sends the first data to the display apparatus 200. For example, the wireless projection apparatus 100 displays displayed text content on a large screen by using the display apparatus 200. Optionally, in a current scenario, the display apparatus 200 is configured to receive and display the first data, but does not send the second data to the wireless projection apparatus 100.

Figure 2:
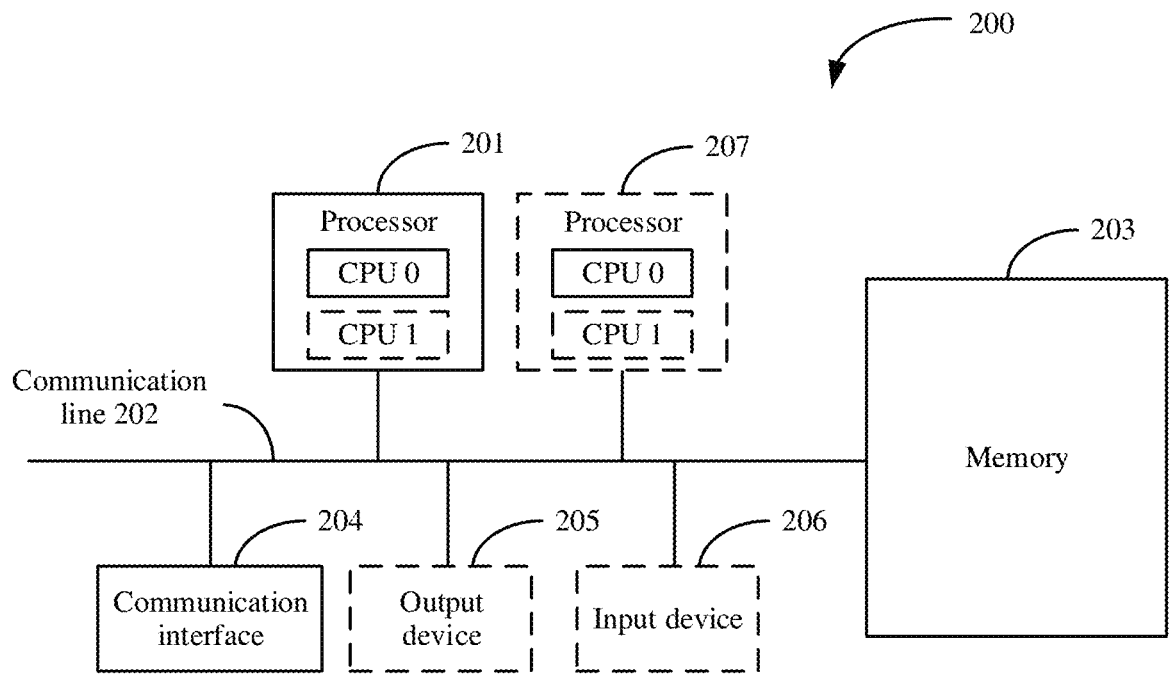
FIG. 2 is a schematic diagram 1 of a structure of a communication apparatus according to an embodiment of the present disclosure.

Optionally, in this embodiment, the wireless projection apparatus 100 and the display apparatus 200 may be implemented via different devices. For example, in this embodiment, the wireless projection apparatus 100 and the display apparatus 200 may be implemented via a communication apparatus in FIG. 2. As shown in FIG. 2, the communication apparatus 200 includes at least one processor 201, a communication line 202, a memory 203, and at least one communication interface 204. The memory 203 may alternatively be included in the processor 201.

The processor 201 may be a central processing unit (CPU), or may be another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, or the processor may be any conventional processor or the like.

The communication line 202 may be a circuit connecting the foregoing components to each other and transmitting information between the foregoing components.

The communication interface 204 is configured to communicate with another device. In embodiments of the present disclosure, the communication interface 204 may be a module, a circuit, a bus, an interface, a transceiver, or another apparatus that can implement a communication function, and is configured to communicate with another device. Optionally, when the communication interface 204 is a transceiver, the transceiver may be an independently disposed transmitter, and the transmitter may be configured to send information to another device. Alternatively, the transceiver may be an independently disposed receiver, and is configured to receive information from another device. Alternatively, the transceiver may be a component integrating functions of sending and receiving information. A specific implementation of the transceiver is not limited in embodiments of the present disclosure.

The memory 203 may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example rather than limitative description, many forms of RAM may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), a direct rambus random access memory (direct rambus RAM, DR RAM), another magnetic storage device, or any other medium that can be used to carry or store expected program code in a form of instructions or a data structure and that can be accessed by a computer, but is not limited thereto. The memory 203 may exist independently, and be connected to the processor 201 through the communication line 202. The memory 203 may alternatively be integrated with the processor 201.

The memory 203 is configured to store computer-executable instructions for implementing solutions of the present disclosure, and the processor 201 controls execution. The processor 201 is configured to execute the computer-executable instructions stored in the memory 203, to implement a wireless projection method provided in the following embodiments of the present disclosure.

It should be noted that the memory described in this specification aims to include but is not limited to these memories and any memory of another proper type.

Optionally, the computer-executable instructions in embodiments of the present disclosure may also be referred to as application program code, instructions, a computer program, or another name. This is not specifically limited in embodiments of the present disclosure.

During specific implementation, in an embodiment, the processor 201 may include one or more CPUs, for example, a CPU 0 and a CPU 1 in FIG. 2.

During specific implementation, in an embodiment, the communication apparatus 200 may include a plurality of processors, for example, the processor 201 and a processor 207 in FIG. 2. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the communication apparatus 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive an input from a user in a plurality of manners. For example, the input device 206 may be a mouse, a keyboard, a touchscreen device, or a sensor device.

It should be noted that the foregoing communication apparatus 200 may be a general-purpose device or a special-purpose device. A type of the communication apparatus is not limited in embodiments of the present disclosure. A structure of the communication apparatus 200 shown in FIG. 2 does not constitute a limitation on the communication apparatus. An actual communication apparatus may include more or fewer components than those shown in the figure, or combine some components, or have different component arrangement. The components shown in the figure may be implemented by hardware, software, or a combination of software and hardware.

The following describes a wireless projection method that is applied to the two wireless projection scenarios in FIG. 1B and FIG. 1C and that is between a wireless projection apparatus and a display apparatus.

Figure 3:
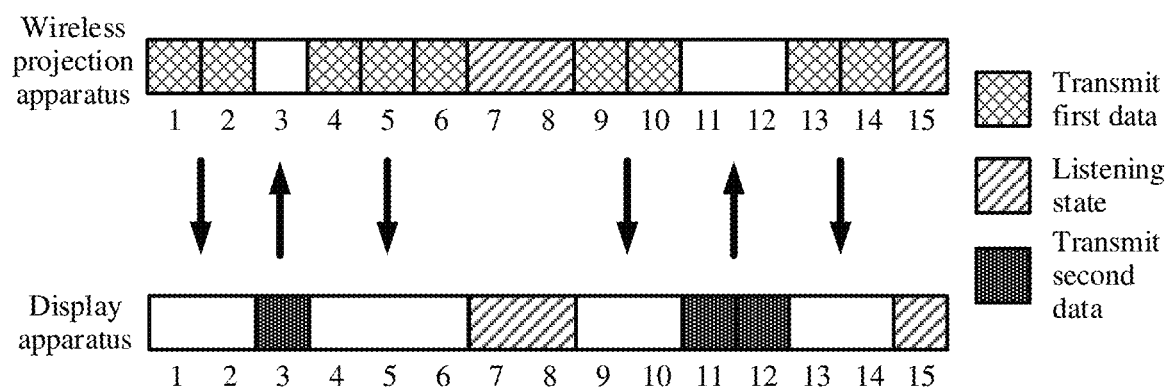
FIG. 3 is a schematic diagram 1 of a frame structure of a wireless projection method in the conventional technology according to an embodiment of the present disclosure.

In the scenario with a high display frame rate shown in FIG. 1B, a low power consumption function is disabled to implement optimal projection experience. As shown in FIG. 3, the wireless projection apparatus sends first data to the display apparatus in a time unit 1 and a time unit 2, and the display apparatus sends second data to the wireless projection apparatus in a time unit 3, to implement wireless projection through data interaction. When there is no first data or second data, the wireless projection apparatus and the display apparatus are in a listening state. For example, the wireless projection apparatus and the display apparatus stay in the listening state in a time unit 7 and a time unit 8, to listen whether the first data or the second data exists in a next time unit, to avoid a data loss. Although the current wireless projection method can provide a user with better wireless projection experience, in a time unit in which no data is transmitted, the electronic device also needs to stay in the listening state, and cannot sleep. This causes large power consumption of a Wi-Fi chip, and affects a service life of the Wi-Fi chip.

Figure 4:
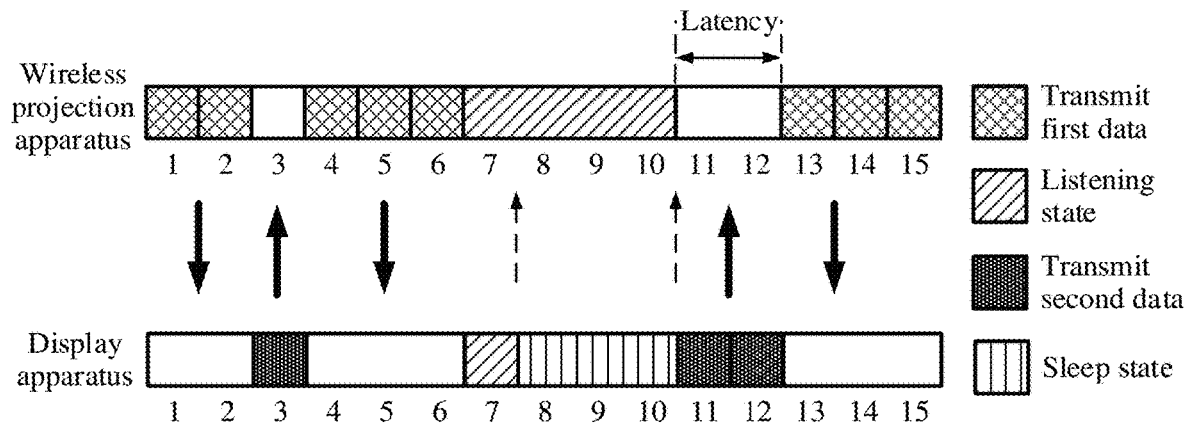
FIG. 4 is a schematic diagram 2 of a frame structure of a wireless projection method in the conventional technology according to an embodiment of the present disclosure.

In the scenario with a low display frame rate shown in FIG. 1C, a sleep time segment is configured, to reduce power consumption of the Wi-Fi chip of the electronic device. As shown in FIG. 4, after receiving the first data sent by the wireless projection apparatus in the time unit 6, the display apparatus determines that the first data or the second data no longer needs to be transmitted, and enters the listening state in the time unit 7. A time threshold for staying in the listening state is preconfigured. It is assumed that the time threshold is one time unit. After confirming that listening time meets a requirement for the time threshold, the display apparatus enters a sleep state and notifies the wireless projection apparatus that the display apparatus no longer receives the first data, thereby reducing power consumption. The foregoing notification may be a power saving notification. Subsequently, after the display apparatus is woken up, a notification is sent to the wireless projection apparatus. Then, the wireless projection apparatus can continue to send the first data. As shown in FIG. 4, the wireless projection apparatus can continue to send the first data only in response to a notification of the display apparatus. This causes a delay in transmission of the first data, for example, the delay is a time unit 11 and a time unit 12. As a result, the wireless projection apparatus responds slowly to a projection update, affecting user experience.

Based on this, an embodiment of the present disclosure provides a wireless projection method, to ensure that a wireless projection apparatus and a display apparatus sleep when no data is transmitted during wireless projection, thereby reducing power consumption without a delay caused by sleep, and improving user experience.

Figure 5A:
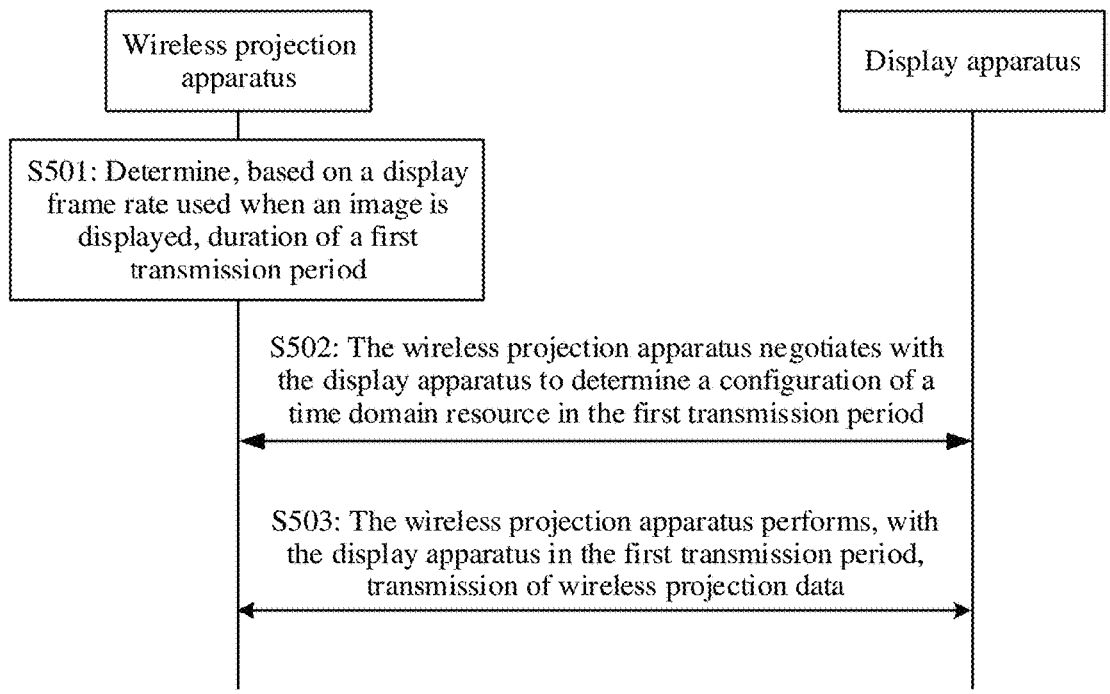
FIG. 5A is a schematic flowchart 1 of a wireless projection method according to an embodiment of the present disclosure.

FIG. 5A is a schematic flowchart 1 of the wireless projection method according to this embodiment. As shown in FIG. 5A, the method includes S501 to S503.

S501: The wireless projection apparatus determines, based on a display frame rate when an image is displayed, a duration of a first transmission period.

The display frame rate indicates a rate at which the wireless projection apparatus displays a first image. A first time segment is a time segment used to send first data to the display apparatus in the first transmission period. The first transmission period may also be referred to as a video service period (VSP). The first data includes the first image, and the first image includes, for example, a video image, an animation image, or a text file image. The first data may further include a control command sent by the wireless projection apparatus to the display apparatus, and the like.

Optionally, before wireless projection starts, the wireless projection apparatus needs to determine the first transmission period of wireless projection. The duration of the first transmission period can meet transmission of data performed by the wireless projection apparatus based on the display frame rate, that is, the current first transmission period needs to meet display of the first image by the display apparatus based on the display frame rate. Specifically, the first transmission period is a reciprocal of the display frame rate. For example, the wireless projection apparatus determines that the display frame rate of the currently displayed first image is 40 Hz. Then, the wireless projection apparatus determines, based on the current display frame rate, that the duration of the first transmission period is 25 ms.

Optionally, the wireless projection apparatus determines, based on content such as the display frame rate and a screen resolution when the image is displayed, a time domain resource for transmitting the first data, that is, determines the first time segment. Subsequently, the wireless projection apparatus transmits image data to the display apparatus in the first time segment, so that the display apparatus can display the first image based on the display frame rate, thereby implementing projection display.

In some embodiments, to implement wireless projection, it should be first ensured that the wireless projection apparatus sends the image data to the display apparatus. Therefore, the first time segment should be first configured in the first transmission period. In other words, in a process of configuring the first transmission period resource, a preceding time domain resource is configured as a resource used to transmit the first data.

Figure 6:
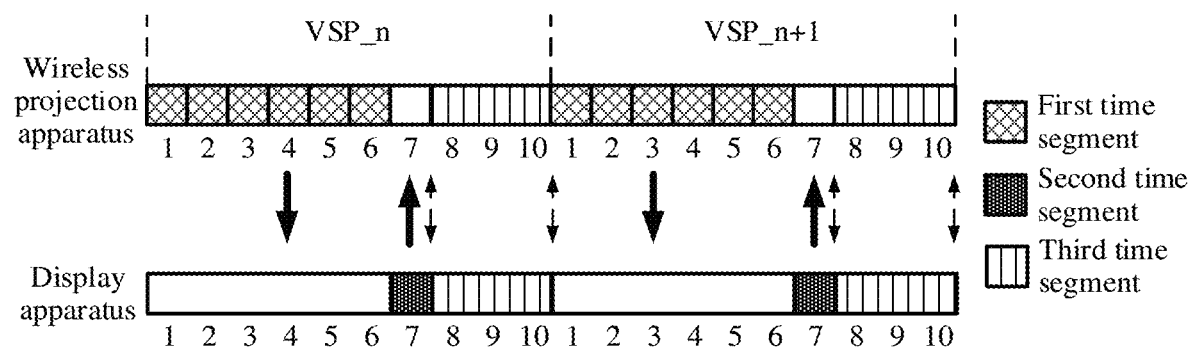
FIG. 6 is a schematic diagram 1 of a frame structure of a wireless projection method according to an embodiment of the present disclosure.

For example, it is assumed that the display frame rate is 100 Hz. The wireless projection apparatus determines, based on the display frame rate, that the first transmission period is 10 ms. As shown in FIG. 6, the first transmission period includes 10 time units, and a duration of each time unit is 1 ms. The wireless projection apparatus determines that 6 ms needs to be occupied for transmitting the first data, that is, six time units need to be occupied. Therefore, a time unit 1 to a time unit 6 are configured as the first time segment.

It should be noted that the duration of the first time segment is less than the first transmission period. The first data may also be referred to as downlink (DL) data, and the first time segment may also be referred to as a DL duration.

S502: The wireless projection apparatus negotiates with the display apparatus to determine a configuration of a time domain resource in the first transmission period.

Optionally, after determining the duration of the first transmission period, the wireless projection apparatus can only determine, based on a device status of the wireless projection apparatus, a configuration of a time domain resource used for transmitting the first data, but cannot determine a time domain resource required for the display apparatus. Therefore, the wireless projection apparatus negotiates with the display apparatus to determine the configuration of the time domain resource in the first transmission period. Subsequently, the wireless projection apparatus and the display apparatus can perform transmission of data based on the same time domain resource configuration to avoid a data loss and implement wireless projection.

Figure 5B:
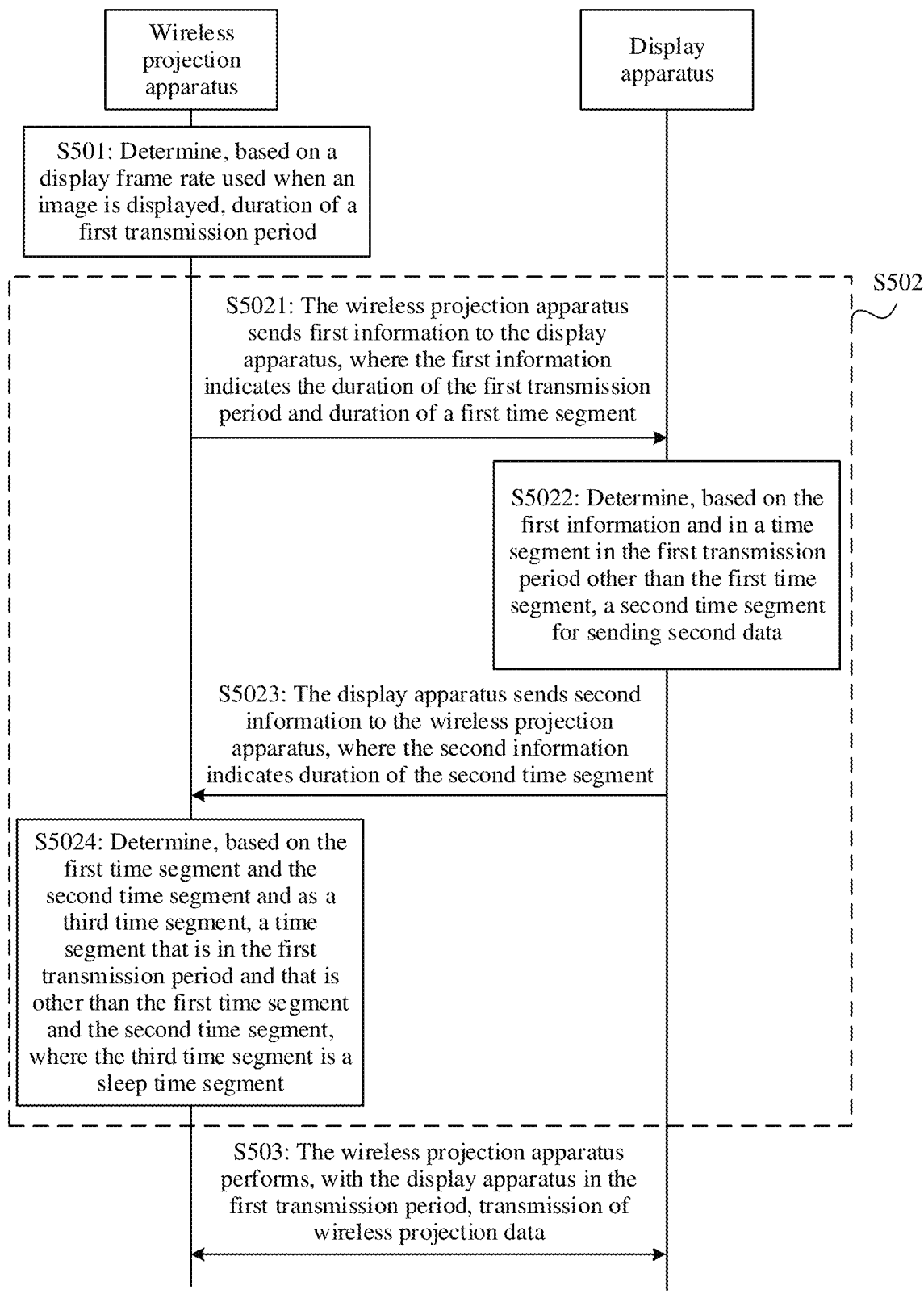
FIG. 5B is a schematic flowchart 2 of a wireless projection method according to an embodiment of the present disclosure.

Optionally, as shown in FIG. 5B, step S502 may be specifically the following step S5021 to step S5024.

S5021: The wireless projection apparatus sends first information to the display apparatus, where the first information indicates the duration of the first transmission period and a duration of the first time segment.

Optionally, before the display apparatus starts projection, the display frame rate is not determined. Therefore, the wireless projection apparatus needs to notify the display apparatus of the duration of the first transmission period. In addition, the wireless projection apparatus notifies the display apparatus of the first time segment configured in the first transmission period, so that the display apparatus subsequently receives, in the first transmission period and in the determined first time segment, the first data sent by the wireless projection apparatus, to implement projection. Further, the display apparatus can configure a remaining time domain resource in the first transmission period based on the first time segment.

Optionally, the first information may indicate the duration of the first transmission period and the duration of the first time segment in an implicit notification manner or an explicit notification manner. The implicit notification manner includes, for example, information about that the first information carries the duration of the first transmission period and the duration of the first time segment. The explicit notification manner includes, for example, a pre-configuration information reading manner, and the first information directly indicates the configuration of the time domain resource. For example, the first information is indication information. After receiving the first information, the display apparatus can determine, in a manner agreed with the wireless projection apparatus in advance, the duration of the first transmission period and the duration of the first time segment that are indicated in the first information.

For example, it is assumed that the duration of the first transmission period is 10 ms, and the duration of the first time segment is 6 ms. In this case, the first information may be 111111XXXX. Each bit indicates 1 ms, a quantity of bits occupied by the first information indicates the duration of the first transmission period, and a value 1 of a bit indicates that the bit is used to transmit the first data.

S5022: The display apparatus determines, based on the first information and in a time segment in the first transmission period other than the first time segment, a second time segment for sending second data.

Optionally, the display apparatus determines a second time segment for transmitting the second data. For example, the second data includes data that needs to be fed back to the wireless projection apparatus after the display apparatus detects a touch or a key operation, image data collected by the display apparatus, and the like. Then, the display apparatus configures the second time segment in a remaining time segment in the first transmission period. In other words, the display apparatus configures a duration of the second time segment based on the device status of the display apparatus and a data transmission requirement. Further, the display apparatus may further configure, as a third time segment used for sleep, a time segment that is in the first transmission period and that is other than the first time segment and the second time segment. In other words, the first time segment, the second time segment, and the third time segment are sequentially configured.

For example, as shown in FIG. 6, the display apparatus determines that 1 ms, that is, a time domain resource of one time unit, needs to be occupied for transmitting the second data, and configures a time unit 7 as the second time segment. Further, it is determined that a remaining time unit 8 to a remaining time unit 10 in the first transmission period are configured as the third time segment.

In some embodiments, if the display apparatus does not generate the second data, the display apparatus does not need to configure the second time segment, or the second time segment is configured as zero. After obtaining the first information, the display apparatus determines, based on the first transmission period and the first time segment, all remaining time segments in the first transmission period as the third time segment.

It should be noted that the second data may also be referred to as uplink (UL) data, and the second time segment may also be referred to as a UL duration. In addition, the duration of the first time segment and the duration of the second time segment should be less than that of the first transmission period.

S5023: The display apparatus sends second information to the wireless projection apparatus, where the second information indicates the duration of the second time segment.

Optionally, the display apparatus uses the second information to notify the wireless projection apparatus of the configured second time segment. Subsequently, the wireless projection apparatus receives the second data sent by the display apparatus in the determined second time segment in the first transmission period, to implement information interaction.

Optionally, the second information may indicate the duration of the second time segment in an implicit notification manner or an explicit notification manner. The implicit notification manner includes, for example, that the second information carries information about the duration of the second time segment. The explicit notification manner includes, for example, a pre-configuration information reading manner, and the second information directly indicates the configuration of the time domain resource. For example, the second information is indication information. After receiving the second information, the wireless projection apparatus can determine, in a manner agreed with the display apparatus in advance, the duration of the second time segment indicated in the second information.

For example, it is assumed that the duration of the first transmission period is 10 ms, the duration of the first time segment is 6 ms, and the duration of the second time segment is 1 ms. In this case, the second information may be 1111110XXX. A value 0 of a bit indicates that the bit is used to transmit the second data.

S5024: The wireless projection apparatus determines, based on the first time segment and the second time segment and as a third time segment, a time segment that is in the first transmission period and that is other than the first time segment and the second time segment, where the third time segment is a sleep time segment.

Optionally, after determining the first time segment and the second time segment, the wireless projection apparatus determines a remaining time domain resource in the first transmission period as the third time segment. For example, as shown in FIG. 6, the display apparatus can determine a configuration of a time domain resource in the first transmission period the same as that of the wireless projection apparatus. Subsequently, the wireless projection apparatus and the display apparatus can use the same resource in the first transmission period to implement wireless projection, without a data loss caused by asymmetric time domain resource information.

In some embodiments, in step S5023, the second information may indicate a duration of the third time segment configured by the display apparatus. In this way, after receiving the second information, the wireless projection apparatus can directly determine all time domain resource configurations of the first transmission period based on the second information. The wireless projection apparatus does not need to repeatedly configure the third time segment, thereby improving resource configuration efficiency of the first transmission period.

In some other embodiments, the second information indicates the second time segment and the third time segment. The wireless projection apparatus determines whether there is an exception in a resource configuration of the first transmission period based on configurations of the second time segment and the third time segment. If there is no exception, the first data starts to be transmitted. In this way, it is further ensured that a resource configuration of the first transmission period of the wireless projection apparatus is the same as that of the display apparatus, to ensure normal projection.

S503: The wireless projection apparatus performs, with the display apparatus in the first transmission period, transmission of wireless projection data.

Optionally, the wireless projection apparatus performs one or more of the following contents in the first transmission period: sending the first data to the display apparatus in the first time segment, receiving, in the second time segment, the second data sent by the display apparatus, or sleeping in the third time segment.

For example, if the display apparatus does not send the second data, the wireless projection apparatus sends the first data in the first time segment in the first transmission period, and sleeps in the third time segment. In this way, the display apparatus can be used to display the first image, thereby implementing Wi-Fi wireless projection.

In this way, the wireless projection apparatus and the display apparatus perform Wi-Fi wireless projection in the first transmission period, to sleep in the third time segment while ensuring that projection is performed based on the display frame rate of the wireless projection apparatus. This avoids a delay caused by sleep, improves user experience, reduces power consumption, and prolongs a life of a Wi-Fi chip.

Figure 7:
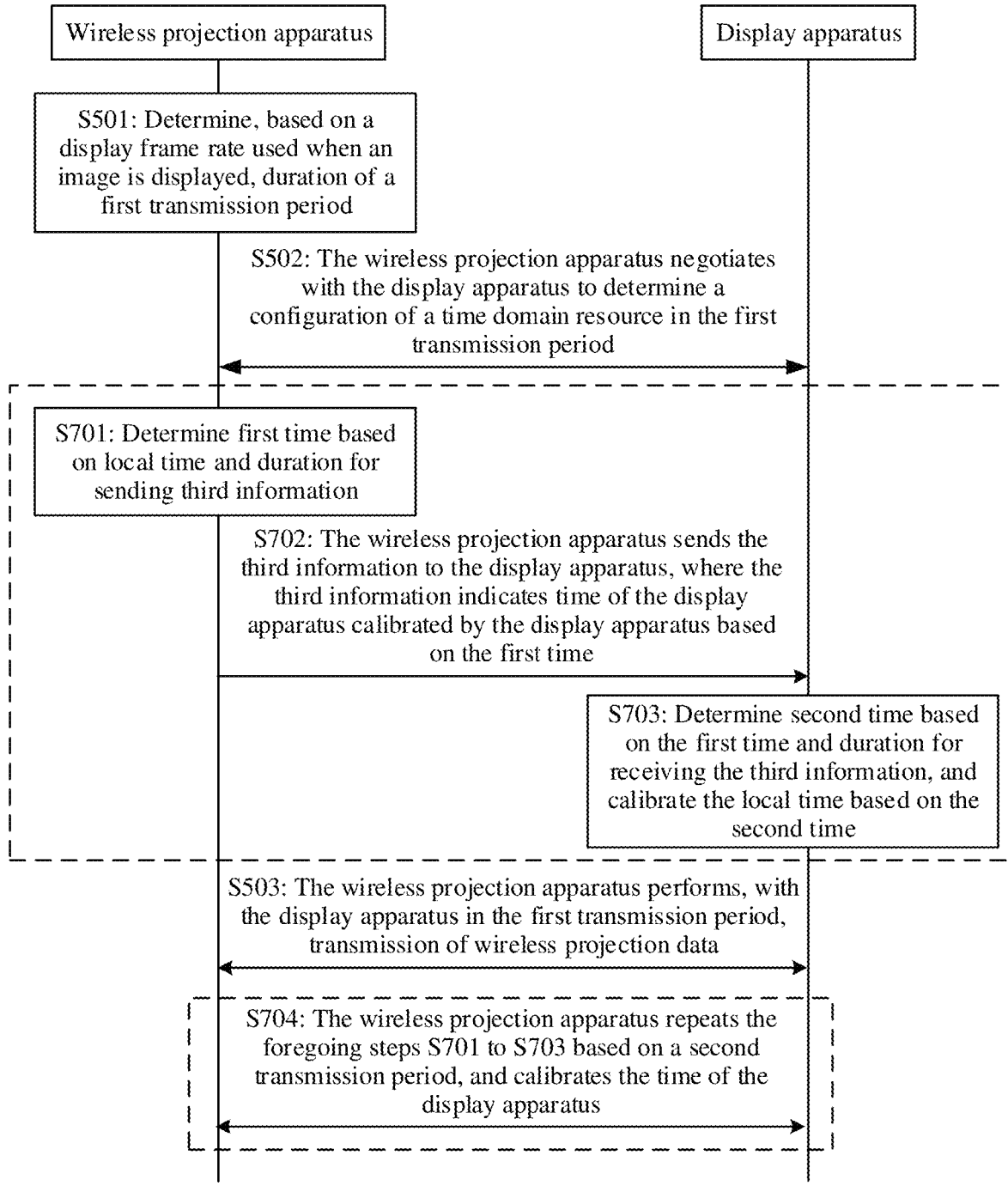
FIG. 7 is a schematic flowchart 3 of a wireless projection method according to an embodiment of the present disclosure.

Optionally, after the first transmission period is configured, if the wireless projection apparatus and the display apparatus need to perform transmission of data in real time in the first transmission period, time synchronization between the wireless projection apparatus and the display apparatus needs to be ensured. Therefore, before projection, time of the wireless projection apparatus and time of the display apparatus need to be synchronized and calibrated. In other words, before step S503, a step of time alignment should be further included. FIG. 7 is a schematic flowchart of another wireless projection method according to an embodiment of the present disclosure. As shown in FIG. 7, before step S503, a wireless projection apparatus and a display apparatus implement time calibration through steps S701 to S703. This embodiment is described by using an example in which time of the wireless projection apparatus is used as a calibration reference, and time of the display apparatus is calibrated based on the time of the wireless projection apparatus.

S701: The wireless projection apparatus determines a first time based on a local time and a duration for sending third information.

The first time is determined by the wireless projection apparatus based on the local time and the duration for sending the third information. The third information indicates time of the display apparatus calibrated by the display apparatus based on the first time.

Figure 8:
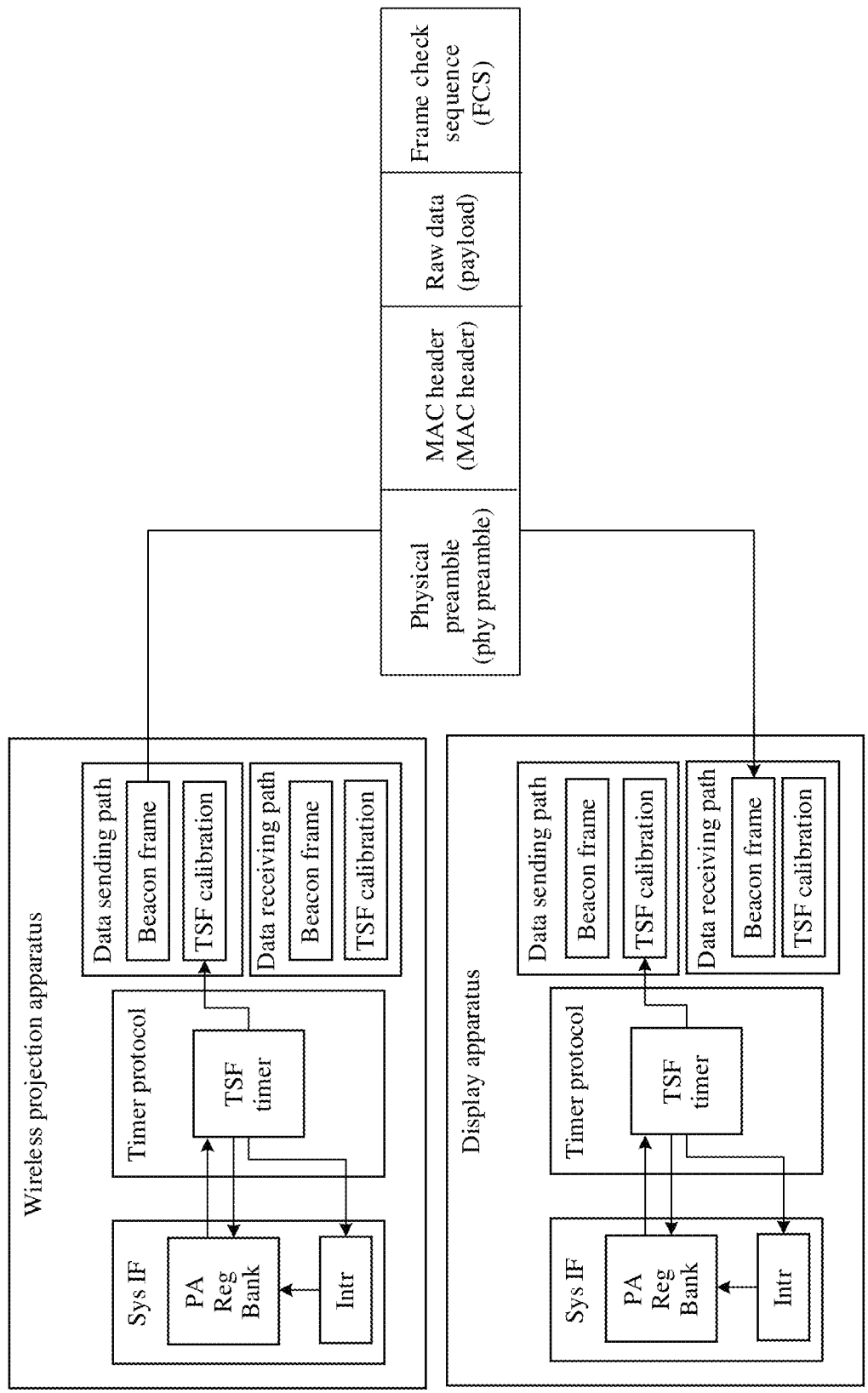
FIG. 8 is a schematic diagram of a structure of a Wi-Fi chip and a structure of a packet according to an embodiment of the present disclosure.

For example, as shown in FIG. 8, a Wi-Fi chip is configured in the wireless projection apparatus. It can be learned from the foregoing description of the TSF technology that, in a Wi-Fi network, a STA sends a beacon frame in a fixed period to perform time synchronization. Therefore, a TSF timer is configured in the Wi-Fi chip for TSF calibration. The TSF timer can determine the local time of the wireless projection apparatus. Then, if the local time needs to be sent, in a data sending process, component transmission is also time-consuming. Therefore, the TSF timer needs to determine the first time based on current local time of the wireless projection apparatus and time consumed for sending the local time in the future, to ensure that the display apparatus obtains an accurate time reference.

S702: The wireless projection apparatus sends the third information to the display apparatus, where the third information indicates time of the display apparatus calibrated by the display apparatus based on the first time.

The third information may be a packet, and the wireless projection apparatus carries the first time in the packet, to send the first time to the display apparatus.

For example, as shown in FIG. 8, an embodiment of the present disclosure provides a packet structure, including a packet header and data of the packet. Information about the packet header includes a physical preamble (phy preamble) and a media storage control address (media access control address, MAC) header of the packet. The MAC header includes a destination address and a source address. In addition, the packet structure further includes a frame check sequence (FCS) used to determine whether an error occurs in a current frame. The wireless projection apparatus carries the first time in the MAC header and sends the first time to the display apparatus based on the packet.

S703: The display apparatus determines a second time based on the first time and a duration for receiving the third information, and calibrates the local time based on the second time.

Optionally, after receiving the third information, the display apparatus obtains the first time. As shown in FIG. 8, in a process in which the display apparatus receives the third information, a specific time is also consumed on a transmission path. Therefore, the TSF timer needs to determine, based on the first time and the time consumed for transmitting the third information, the second time for time alignment, and calibrate the local time based on the second time. For example, after receiving the packet sent by the wireless projection apparatus, the display apparatus parses the first time carried in the packet and calibrates the local time based on the first time.

For example, if the TSF timer in the wireless projection apparatus determines that the local time is 5:00 and a duration for transmitting the third information is one minute, the first time is determined as 5:01. The wireless projection apparatus sends, based on the third information, the first time to the display apparatus. After the display apparatus receives the third information, the TSF timer in the display apparatus determines that the first time is 5:01, and the duration for transmitting the third information is two minutes. Therefore, the second time is 5:03. Then, the local time is changed to 5:03.

In this way, time calibration ensures that local time of the wireless projection apparatus is the same as that of the display apparatus. The wireless projection apparatus and the display apparatus can implement real-time Wi-Fi wireless projection based on the same time and the configured first transmission period to avoid a projection exception.

Optionally, to avoid unaligned time between the wireless projection apparatus and the display apparatus due to a local time change of the wireless projection apparatus and/or the display apparatus during projection, the second transmission period is configured. During wireless projection, that is, in a process of executing step S503, the wireless projection apparatus and the display apparatus perform time calibration based on the second transmission period. As shown in FIG. 7, the time alignment process further includes step S704.

S704: The wireless projection apparatus repeats the foregoing steps S701 to S703 based on the second transmission period, and calibrates the time of the display apparatus.

Optionally, to implement Wi-Fi wireless projection, the wireless projection apparatus and the display apparatus are connected to a same Wi-Fi network. It can be learned from the foregoing description of the TSF technology that the wireless projection apparatus and the display apparatus can periodically send a beacon frame to implement time synchronization. Therefore, the second transmission period is configured as a beacon sending period. In other words, the second transmission period is a beacon period. A time calibration period in the Wi-Fi network is used to calibrate the time of the wireless projection apparatus and the time of the display apparatus. In this case, the third information is a beacon frame.

In this way, time calibration is performed on the wireless projection apparatus and the display apparatus based on a preconfigured transmission period, so that no exception is caused by unaligned time in a process in which the wireless projection apparatus and the display apparatus perform Wi-Fi wireless projection in the first transmission period. Further, synchronization precision of the wireless projection apparatus and the display apparatus can reach a µs level, thereby improving transmission efficiency in a Wi-Fi wireless projection process.

Optionally, the wireless projection apparatus and the display apparatus perform time calibration based on the second transmission period, to ensure that between two time calibration points, there is no transmission exception caused by unaligned time between the wireless projection apparatus and the display apparatus. Before and after the sleep time segment, the display apparatus sends a request to the wireless projection apparatus to request to sleep or wake up, so as to ensure that the wireless projection apparatus and the display apparatus can sleep or wake up at the same time, thereby avoiding a loss of transmitted data.

In some embodiments, the wireless projection apparatus receives a first request sent by the display apparatus. The first request is used to request to sleep. The first request is a request sent by the display apparatus at any one of the following moments: at an end of the second time segment, after last second data is sent, at an end of the first time segment, and after last first data is received. In response to the first request, the wireless projection apparatus starts to sleep and indicates the display apparatus to sleep. Optionally, the wireless projection apparatus adds a flag to the last sent first data. After receiving the first data, the display apparatus can determine, based on the flag, that current data is the last first data.

For example, as shown in FIG. 6, after the time unit 7 ends, the display apparatus sends the first request to the wireless projection apparatus. After receiving the first request, the wireless projection apparatus checks whether the current time is the end of the second time segment and is about to enter the third time segment. If it is determined that there is no exception in the time, the wireless projection apparatus and the display apparatus enter the sleep state in response to the first request to reduce power consumption.

In some embodiments, the wireless projection apparatus receives a second request sent by the display apparatus. The second request is used to request to wake up. The second request is a request sent by the display apparatus after the first transmission period ends. In response to the second request, the wireless projection apparatus wakes up the display apparatus and sends the first data to the display apparatus.

For example, as shown in FIG. 6, after the time unit 10 ends, the display apparatus sends the second request to the wireless projection apparatus. After receiving the second request, the wireless projection apparatus checks whether current time is the end of the third time segment and is about to stop sleeping. If it is determined that there is no exception in the time, the wireless projection apparatus and the display apparatus enter a wake-up state in response to the second request to ensure normal data transmission in a next period.

Optionally, in a process in which the wireless projection apparatus and the display apparatus perform Wi-Fi wireless projection, a time domain resource in the first transmission period may change due to a change of a display frame rate or the like. Therefore, a preconfigured period is configured, and the wireless projection apparatus and the display apparatus determine, based on the preconfigured period, whether the resource configuration of the first transmission period changes and whether the first transmission period needs to be reconfigured. After determining that the display frame rate changes, the wireless projection apparatus notifies the display apparatus to reconfigure the time domain resource of the first transmission period. A method for reconfiguring the time domain resource of the first transmission period is the same as the method for configuring the time domain resource of the first transmission period. For details, refer to the foregoing steps, and details are not described herein again.

Figure 9:
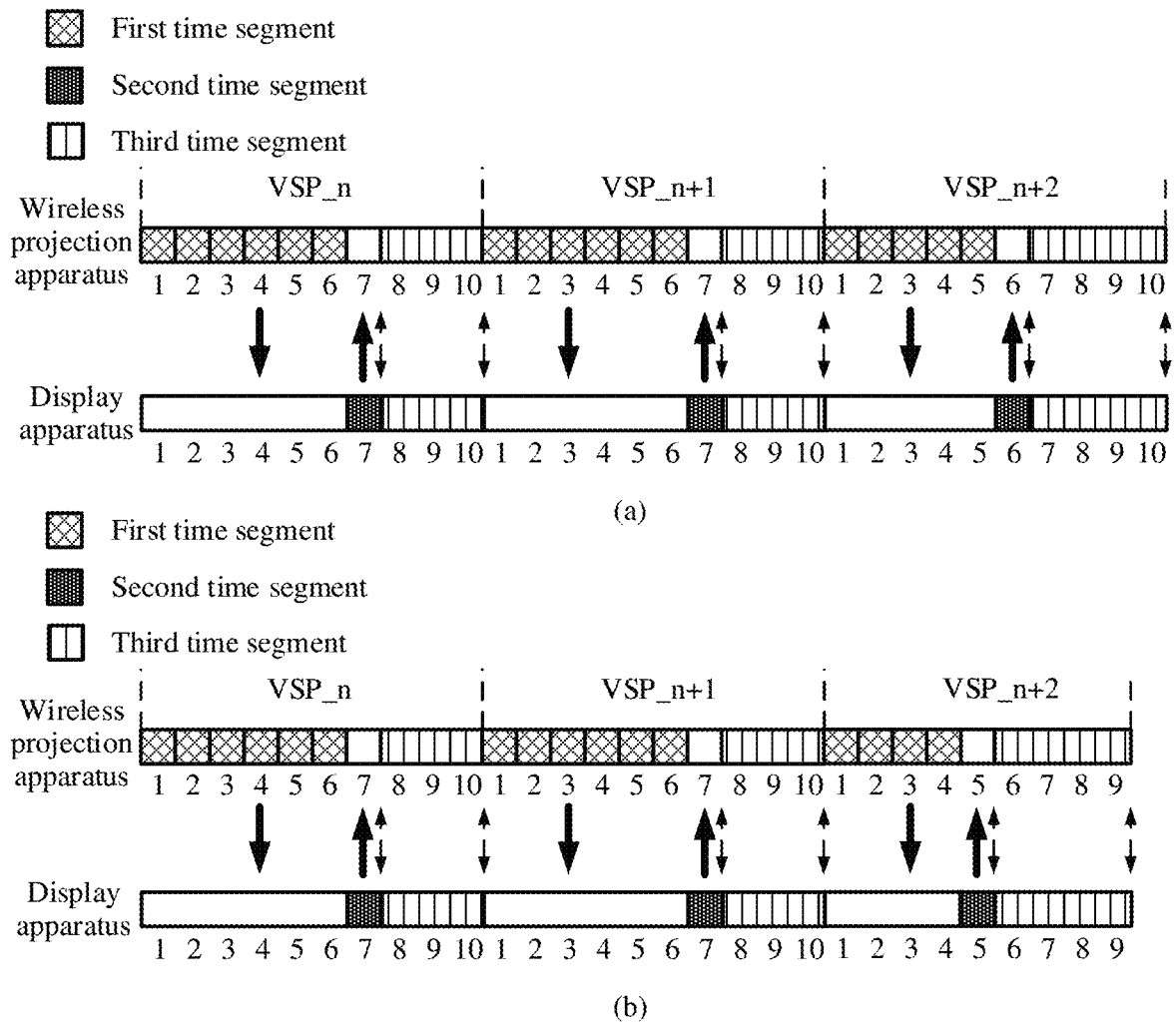
FIG. 9 is a schematic diagram 2 of a frame structure of a wireless projection method according to an embodiment of the present disclosure.

For example, as shown in (a) in FIG. 9, in a process in which the wireless projection apparatus determines the time domain resource in the first transmission period based on the preconfigured period, the first time segment determined in VSP_n+2 changes, and a quantity of time units is reduced from six to five. The wireless projection apparatus notifies the display apparatus to reconfigure the first transmission period. As shown in (a) in FIG. 9, after the first transmission period is reconfigured, starting from VSP_n+2, the first time segment is the time unit 1 to a time unit 5, the second time segment is the time unit 6, and the third time segment is the time unit 7 to the time unit 10.

For another example, as shown in (b) in FIG. 9, after VSP_n+1 ends, the wireless projection apparatus determines that the display frame rate increases, and then re-determines, based on a changed display frame rate, that the first transmission period is nine time units and the first time segment is four time units. In addition, the wireless projection apparatus needs to notify the display apparatus to reconfigure the first transmission period. As shown in (b) in FIG. 9, after the first transmission period is reconfigured, starting from VSP_n+2, the first time segment is the time unit 1 to a time unit 4, the second time segment is the time unit 5, and the third time segment is the time unit 6 to a time unit 9.

In this way, during Wi-Fi wireless projection, the configuration of the time domain resource in the first transmission period is updated based on the preconfigured period, to avoid a transmission exception caused by a change of a condition such as the display frame rate.

The foregoing describes the solutions provided in embodiments of the present disclosure mainly from a perspective of interaction between network elements. It may be understood that each network element, for example, the wireless projection apparatus and the display apparatus, includes corresponding hardware structures and/or software modules for performing the foregoing functions. A person skilled in the art should easily be aware that, in combination with units and algorithm steps of the examples described in embodiments disclosed in this specification, the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In embodiments of the present disclosure, functional modules in the electronic device may be defined based on the foregoing method examples. For example, each functional module may be defined in a correspondence to each function, or two or more functions may be integrated in one processing module. The functional module may be implemented in a form of hardware, or may be implemented in a form of a software functional module. It should be noted that, in embodiments of the present disclosure, module division is an example, and is merely a logical function division. In actual implementation, another division manner may be used. The following uses division of each functional module based on a corresponding function as an example for description.

Figure 10:
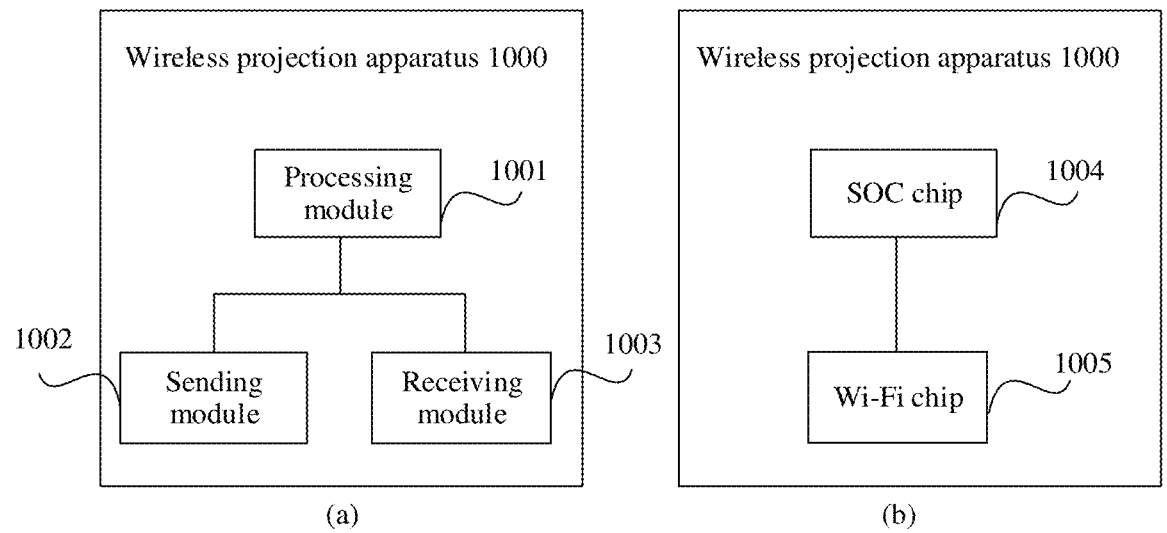
FIG. 10 is a schematic diagram of a structure of a wireless projection apparatus according to an embodiment of the present disclosure.

(a) in FIG. 10 is a schematic diagram of a possible structure of a wireless projection apparatus according to the foregoing embodiment when an integrated module is used. The wireless projection apparatus 1000 may be a wireless projection apparatus, or a chip disposed in the wireless projection apparatus. The wireless projection apparatus 1000 includes a processing module 1001, a sending module 1002, and a receiving module 1003.

The processing module 1001 is configured to support the wireless projection apparatus 1000 in performing one or more of step S501 and step S5024 in the foregoing embodiment; and/or the processing module 1001 is further configured to support the wireless projection apparatus 1000 in performing another step performed by the wireless projection apparatus in embodiments of the present disclosure.

The sending module 1002 is configured to support the wireless projection apparatus 1000 in performing one or more of step S502, step S503, and step S5021 in the foregoing embodiment. The sending module 1002 is further configured to support the wireless projection apparatus 1000 in performing other steps performed by the wireless projection apparatus in embodiments of the present disclosure.

The receiving module 1003 is configured to support the wireless projection apparatus 1000 in performing one or more of step S502, step S503, and step S5023 in the foregoing embodiment. The receiving module 1003 is further configured to support the wireless projection apparatus 1000 in performing other steps performed by the wireless projection apparatus in embodiments of the present disclosure.

All related content of the steps in the foregoing method embodiments may be cited in function descriptions of the corresponding functional modules. Details are not described herein again.

Based on hardware implementation, the processing module 1001 in the wireless projection apparatus 1000 shown in (a) in FIG. 10 may be implemented by a processor or a processor-related circuit component, or may be a processor or a processing unit. The sending module 1002 may be a transmitter, and the receiving module 1003 may be a receiver. The sending module 1002 and the receiving module 1003 may be combined into a transceiver unit. The transceiver unit may be implemented by a transceiver or a transceiver-related circuit component, or may be a transceiver or a transceiver unit. The transceiver may also be referred to as a communication interface or a transceiver.

Optionally, during actual application, as shown in (b) in FIG. 10, the processing module 1001 is usually integrated into a system on chip (SOC) 1004. The sending module 1002 and the receiving module 1003 are integrated in one Wi-Fi chip 1005.

In some embodiments, some functions of the processing module 1001 are further integrated into the Wi-Fi chip 1005. The Wi-Fi chip 1005 is configured to support the wireless projection apparatus 1000 in performing step S701, step S702, step S703, and step S704 in the foregoing embodiment.

Optionally, the wireless projection apparatus 1000 shown in (a) in FIG. 10 may further include a storage module (not shown in (a) in FIG. 10), and the storage module stores a program or instructions. When the processing module executes the program or the instructions, the wireless projection apparatus 1000 shown in (a) in FIG. 10 is enabled to perform the wireless projection methods shown in FIG. 5A, FIG. 5B, and FIG. 7.

For technical effect of the wireless projection apparatus 1000 shown in (a) or (b) in FIG. 10, refer to the technical effect of the wireless projection methods shown in FIG. 5A, FIG. 5B, and FIG. 7. Details are not described herein again.

Figure 11:
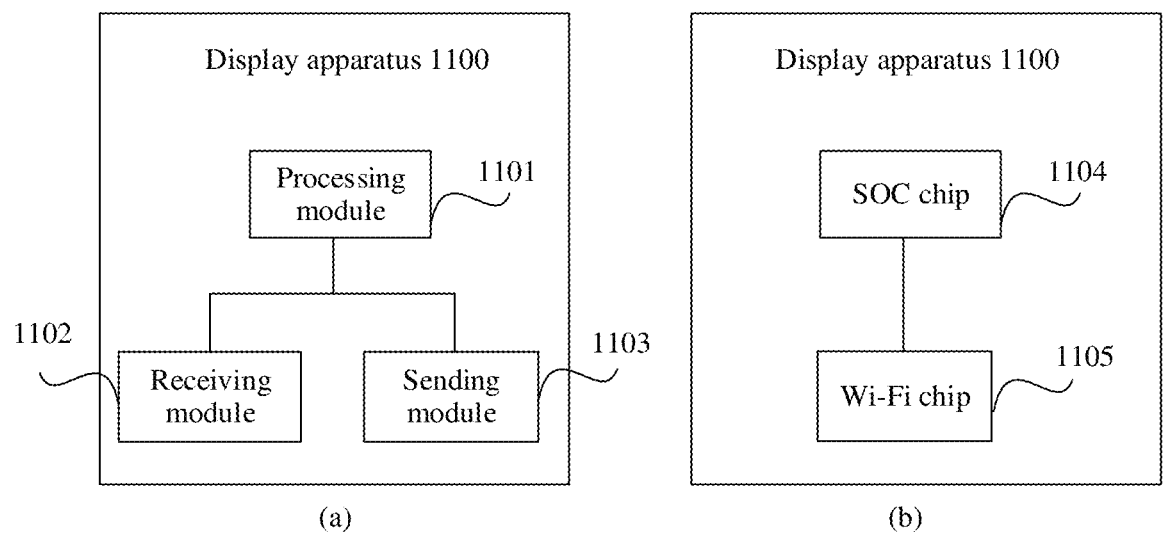
FIG. 11 is a schematic diagram of a structure of a display apparatus according to an embodiment of the present disclosure.

(a) in FIG. 11 is a schematic diagram of a possible structure of a display apparatus according to the foregoing embodiment when an integrated module is used. The display apparatus 1100 may be a display apparatus, or a chip disposed in the display apparatus. The display apparatus 1100 includes a processing module 1101, a receiving module 1102, and a sending module 1103.

The processing module 1101 is configured to support the display apparatus 1100 in performing step S5022 in the foregoing embodiment; and/or the processing module 1101 is further configured to support the display apparatus 1100 in performing another step performed by the display apparatus in embodiments of the present disclosure.

The receiving module 1102 is configured to support the display apparatus 1100 in performing one or more of step S502, step S503, and step S5021 in the foregoing embodiment. The receiving module 1102 is further configured to support the display apparatus 1100 in performing other steps performed by the display apparatus in embodiments of the present disclosure.

The sending module 1103 is configured to support the display apparatus 1100 in performing one or more of step S502, step S503, and step S5023 in the foregoing embodiment. The sending module 1103 is further configured to support the display apparatus 1100 in performing another step performed by the display apparatus in embodiments of the present disclosure.

Optionally, the display apparatus 1100 further includes a display module, configured to display an image based on wireless projection data.

All related content of the steps in the foregoing method embodiments may be cited in function descriptions of the corresponding functional modules. Details are not described herein again.

Based on hardware implementation, the processing module 1101 in the display apparatus 1100 shown in (a) in FIG. 11 may be implemented by a processor or a processor-related circuit component, or may be a processor or a processing unit. The receiving module 1102 may be a receiver, and the sending module 1103 may be a transmitter. The receiving module 1102 and the sending module 1103 may be combined into a transceiver unit. The transceiver unit may be implemented by a transceiver or a transceiver-related circuit component, or may be a transceiver or a transceiver unit. The transceiver may also be referred to as a communication interface or a transceiver.

Optionally, during actual application, as shown in (b) in FIG. 11, the processing module 1101 is usually integrated into a SOC chip 1104. The receiving module 1102 and the sending module 1103 are integrated in one Wi-Fi chip 1105.

In some embodiments, some functions of the processing module 1101 are further integrated into the Wi-Fi chip 1105. The Wi-Fi chip 1105 is configured to support the display apparatus 1100 in performing step S701, step S702, step S703, and step S704 in the foregoing embodiment.

Optionally, the display apparatus 1100 shown in (a) in FIG. 11 may further include a storage module (not shown in (a) in FIG. 11), and the storage module stores a program or instructions. When the processing module executes the program or the instructions, the display apparatus 1100 shown in (a) in FIG. 11 is enabled to perform the wireless projection methods shown in FIG. 5A, FIG. 5B, and FIG. 7.

For technical effect of the display apparatus 1100 shown in (a) or (b) in FIG. 11, refer to the technical effect of the wireless projection methods shown in FIG. 5A, FIG. 5B, and FIG. 7. Details are not described herein again.

An embodiment of the present disclosure provides an information transmission system, including a wireless projection apparatus and a display apparatus. The wireless projection apparatus is a transmit device, and the display apparatus is a receive device.

The wireless projection apparatus is configured to perform step S501, step S502, and step S503 in FIG. 5A, perform one or more of step S5021, step S5023, and step S5024 in FIG. 5B, perform one or more of step S701, step S702, and step S704 in FIG. 7, and/or perform another process of the technology described in this specification.

The display apparatus is configured to perform step S502 and step S503 in FIG. 5A, perform one or more of step S5021, step S5022, and step S5023 in FIG. 5B, perform one or more of step S702, step S703, and step S704 in FIG. 7, and/or perform another process of the technology described in this specification.

All related content of the steps in the foregoing method embodiments may be cited in function descriptions of the corresponding electronic devices. Details are not described herein again.

An embodiment of the present disclosure further provides a chip system, including a processor, where the processor is coupled to a memory. The memory is configured to store a program or instructions. When the program or the instructions are executed by the processor, the chip system is enabled to implement the method according to any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in the present disclosure. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in the present disclosure.

For example, the chip system may be a field programmable gate array (FPGA), an application-specific integrated circuit (ASIC), a SOC chip, a Wi-Fi chip, a central processing unit (CPU), a network processor (NP), a digital signal processing circuit (digital signal processor, DSP), a micro controller unit (MCU), a programmable logic device (PLD), or another integrated chip.

It should be understood that the steps in the foregoing method embodiments may be completed by using a hardware integrated logic circuit or instructions in a form of software in the processor. The steps in the methods disclosed with reference to embodiments of the present disclosure may be directly performed and completed by a hardware processor, or may be performed and completed by using a combination of hardware in the processor and a software module.

An embodiment of the present disclosure further provides a storage medium, configured to store instructions used by the wireless projection apparatus.

An embodiment of the present disclosure further provides a computer-readable storage medium. The computer-readable storage medium stores computer-readable instructions. When a computer reads and executes the computer-readable instructions, the computer is enabled to perform the method according to any one of the foregoing method embodiments.

An embodiment of the present disclosure further provides a computer program product, for example, a computer-readable storage medium. The computer program product includes a program designed to perform steps performed by the wireless projection apparatus in the foregoing embodiments.

Method or algorithm steps described in combination with the content disclosed in the present disclosure may be implemented by hardware, or may be implemented by a processor by executing software instructions. The software instructions may include a corresponding software module. The software module may be stored in a random access memory (RAM), a flash memory, a read-only memory (ROM), an erasable programmable read-only memory (erasable programmable ROM, EPROM), an electrically erasable programmable read-only memory (electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an application-specific integrated circuit (ASIC).

In the several embodiments provided in the present disclosure, it should be understood that the disclosed system, apparatus, and method may be implemented in other manners. For example, the described apparatus embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A wireless projection apparatus, comprising:
at least one processor, configured to:
determine, based on a display frame rate used when the wireless projection apparatus displays an image, a duration of a first transmission period; and
determine, by negotiating with a display apparatus, a configuration of a time domain resource in the first transmission period, wherein the time domain resource in the first transmission period is configured to comprise a first time segment, a second time segment, and a third time segment, the first time segment is a time segment in which first data is sent to the display apparatus, the second time segment is a time segment in which second data is received from the display apparatus, and the third time segment is a time segment in which the wireless projection apparatus sleeps; and
a transceiver, configured to perform transmission of wireless projection data with the display apparatus in the first transmission period,
wherein the transceiver is further configured to send third information to the display apparatus, wherein the third information indicates the display apparatus to calibrate time of the display apparatus based on a first time, and the first time is determined by the transceiver based on a local time and a duration for sending the third information.

2. The apparatus according to claim 1, wherein
the transceiver is further configured to:
send first information to the display apparatus, wherein the first information indicates the duration of the first transmission period and a duration of the first time segment; and
receive second information from the display apparatus in response to the first information, wherein the second information indicates a duration of the second time segment; and
the at least one processor is further configured to: configure, based on the duration of the first time segment and the duration of the second time segment, a remaining time segment in the first transmission period as the third time segment.

3. The apparatus according to claim 1, wherein in the first transmission period, the first time segment, the second time segment, and the third time segment are sequentially configured.

4. The apparatus according to claim 1, wherein
the transceiver is further configured to send the third information to the display apparatus in a second transmission period, wherein the second transmission period is a beacon period.

5. The apparatus according to claim 1, wherein
the transceiver is further configured to receive a first request from the display apparatus, wherein the first request requests to sleep, and the first request is sent by the display apparatus at an end of the second time segment, after last second data is sent, at an end of the first time segment, or after last first data is received; and
the at least one processor is further configured to: after indicating, in response to the first request, the display apparatus to sleep, control the transceiver to sleep.

6. The apparatus according to claim 1, wherein
the transceiver is further configured to receive a second request from the display apparatus, wherein the second request requests to wake up, and the second request is from the display apparatus after the first transmission period ends; and
the at least one processor is further configured to: in response to the second request, wake up the display apparatus, and control the transceiver to send the first data to the display apparatus.

7. The apparatus according to claim 1, wherein the duration of the first transmission period meets transmission of the wireless projection data performed by the transceiver based on the display frame rate.

8. The apparatus according to claim 7, wherein the first transmission period is a reciprocal of the display frame rate.

9. A display apparatus, comprising:
- at least one processor, configured to negotiate with a wireless projection apparatus to determine a configuration of a time domain resource in a first transmission period, wherein a duration of the first transmission period is determined by the wireless projection apparatus based on a display frame rate when an image is displayed, the time domain resource in the first transmission period is configured to comprise a first time segment, a second time segment, and a third time segment, the first time segment is a time segment in which first data is received from the wireless projection apparatus, the second time segment is a time segment that is determined by the at least one processor and that is a time segment in which second data is sent to the wireless projection apparatus, and the third time segment is a time segment in which the wireless projection apparatus sleeps;
- a transceiver, configured to perform transmission of wireless projection data with the wireless projection apparatus in the first transmission period; and
- a display, configured to display the image based on the wireless projection data,
- wherein the transceiver is further configured to send third information to the display apparatus, the third information indicates the display apparatus to calibrate time of the display apparatus based on a first time, and the first time is determined by the transceiver based on a local time and a duration for sending the third information.

10. The apparatus according to claim 9, wherein
the transceiver is further configured to:
- receive first information from the wireless projection apparatus, wherein the first information indicates the duration of the first transmission period and a duration of the first time segment; and
- send second information to the wireless projection apparatus, wherein the second information indicates a duration of the second time segment; and
- the at least one processor is further configured to: configure, based on the duration of the first time segment and the duration of the second time segment, a remaining time segment in the first transmission period as the third time segment.

11. The apparatus according to claim 9, wherein in the first transmission period, the first time segment, the second time segment, and the third time segment are sequentially configured.

12. The apparatus according to claim 9, wherein
the transceiver is further configured to receive the third information from the wireless projection apparatus in a second transmission period, wherein the second transmission period is a beacon period.

13. The apparatus according to claim 9, wherein
the transceiver is further configured to send a first request to the wireless projection apparatus, wherein the first request requests to sleep, and the first request is sent at an end of the second time segment, after last second data is sent, at an end of the first time segment, or after last first data is received; and
the at least one processor is further configured to control, after determining that the wireless projection apparatus receives the first request, the transceiver to sleep.

14. The apparatus according to claim 9, wherein
the transceiver is further configured to send a second request to the wireless projection apparatus after the first transmission period ends, wherein the second request requests to wake up; and
the at least one processor is further configured to: after determining that the wireless projection apparatus receives the second request, wake up the transceiver and control the transceiver to receive the first data.

15. The apparatus according to claim 9, wherein the duration of the first transmission period meets display of the image by the display based on the display frame rate.

16. The apparatus according to claim 15, wherein the first transmission period is a reciprocal of the display frame rate.

17. A wireless projection method, comprising:
- determining, by a wireless projection apparatus based on a display frame rate used when the wireless projection apparatus displays an image, a duration of a first transmission period;
- negotiating, by the wireless projection apparatus with a display apparatus, to determine a configuration of a time domain resource in the first transmission period, wherein the time domain resource in the first transmission period is configured to comprise a first time segment, a second time segment, and a third time segment, the first time segment is a time segment in which first data is sent to the display apparatus, the second time segment a time segment in which second data is received from the display apparatus, and the third time segment is a time segment in which the wireless projection apparatus sleeps;
- performing, by the wireless projection apparatus, transmission of wireless projection data with the display apparatus in the first transmission period; and
- sending, by the wireless projection apparatus, third information to the display apparatus, wherein the third information indicates the display apparatus to calibrate time of the display apparatus based on a first time, and the first time is determined based on a local time and a duration for sending the third information.

18. The method according to claim 17, wherein the negotiating, by the wireless projection apparatus with a display apparatus, to determine a configuration of a time domain resource in the first transmission period comprises:
- sending, by the wireless projection apparatus, first information to the display apparatus, wherein the first information indicates the duration of the first transmission period and a duration of the first time segment;
- receiving, by the wireless projection apparatus, second information from the display apparatus in response to the first information, wherein the second information indicates a duration of the second time segment; and
- configuring, by the wireless projection apparatus based on the duration of the first time segment and the duration of the second time segment, a remaining time segment in the first transmission period as the third time segment.

* * * * *